(12) United States Patent
Yang et al.

(10) Patent No.: US 11,679,341 B2
(45) Date of Patent: Jun. 20, 2023

(54) DIFFERENTIATION OF NATURAL VITAMIN E FROM SYNTHETIC VITAMIN E AND QUANTIFICATION OF TOCOPHEROLS BY SUPERCRITICAL FLUID CHROMATOGRAPHY

(71) Applicant: Waters Technologies Corporation, Milford, MA (US)

(72) Inventors: Jinchuan Yang, Hopkinton, MA (US); Paul Rainville, Princeton, MA (US)

(73) Assignee: Waters Technologies Corporation, Milford, MA (US)

( * ) Notice: Subject to any disclaimer, the term of this patent is extended or adjusted under 35 U.S.C. 154(b) by 98 days.

(21) Appl. No.: 17/244,451

(22) Filed: Apr. 29, 2021

(65) Prior Publication Data

US 2021/0339167 A1 Nov. 4, 2021

Related U.S. Application Data

(60) Provisional application No. 63/017,994, filed on Apr. 30, 2020.

(51) Int. Cl.
*B01D 15/38* (2006.01)
*B01D 15/40* (2006.01)

(52) U.S. Cl.
CPC ......... *B01D 15/3833* (2013.01); *B01D 15/40* (2013.01)

(58) Field of Classification Search
CPC .......................... B01D 15/3833; B01D 15/40
See application file for complete search history.

(56) References Cited

U.S. PATENT DOCUMENTS 3,455,959 A * 7/1969 Schudel ............... C07D 311/72
549/411
2018/0155311 A1* 6/2018 Burger .................. B01D 15/40

OTHER PUBLICATIONS

Roy, D., et al., "Ramifications and insights on the role of water in chiral sub/supercritical fluid chromatography", Anal. Chem. 91, pp. 14672-14680. (Year: 2019).*
West, C., "Enantioselective separations with supercritical fluids—review", Current analytical chemistry, 10, 99-120. (Year: 2014).*

* cited by examiner

*Primary Examiner* — Benjamin L Lebron
(74) *Attorney, Agent, or Firm* — Womble Bond Dickinson (US) LLP; Deborah M. Vernon; Scott R. Breining

(57) ABSTRACT

The present disclosure provides methods for the separation and quantitation of enantiomers of vitamin E using supercritical fluid chromatography (SFC) or carbon dioxide-based chromatography on chiral columns. The disclosed methods may be used to quantitatively determine the concentration of RRR-α-tocopherol in foods, food ingredients, dietary supplements, vitamin premixes, nutritional formulas, and medicines. Further provided is a method of differentiating the source of α-tocopherol as natural or synthetic.

15 Claims, 16 Drawing Sheets

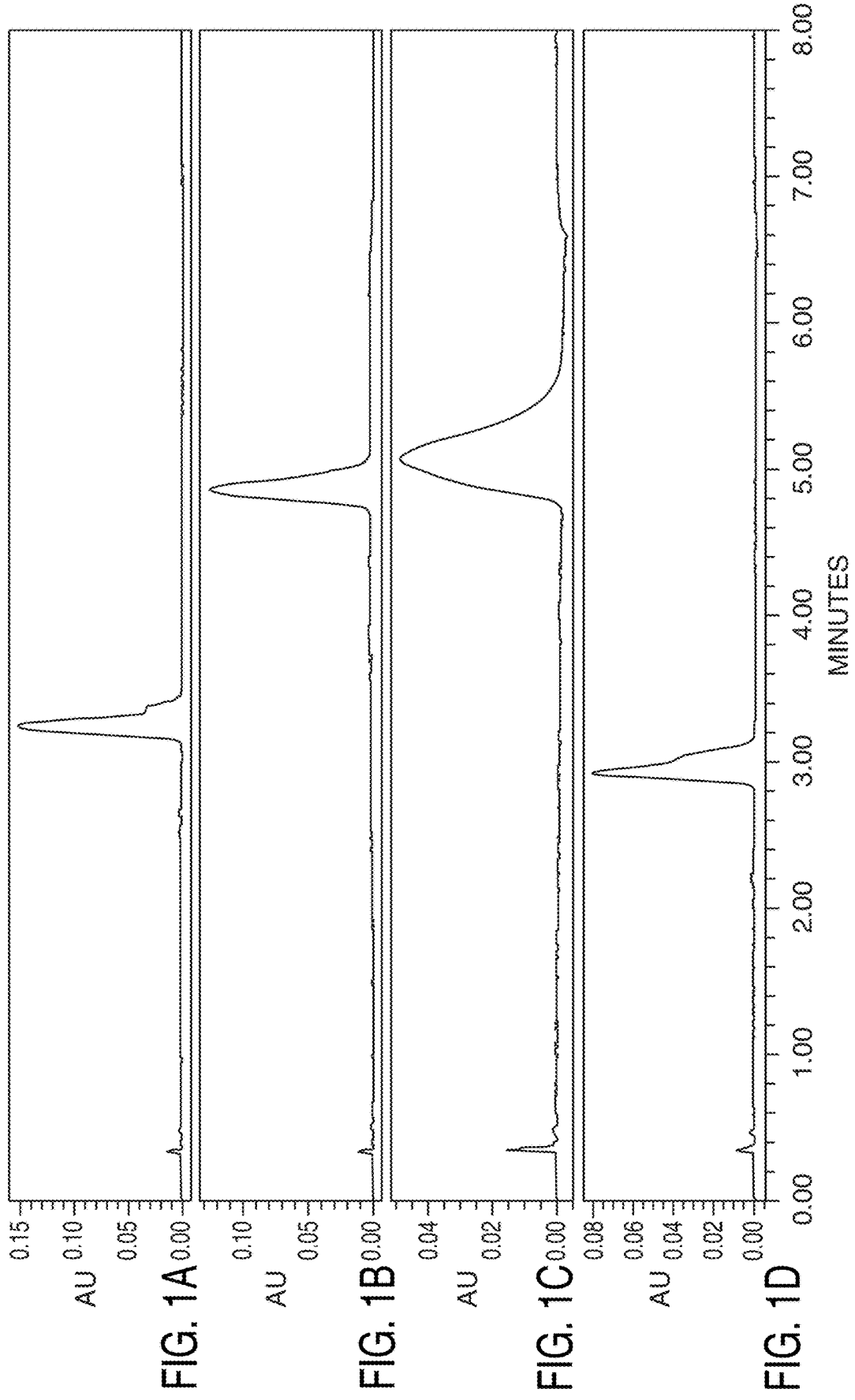

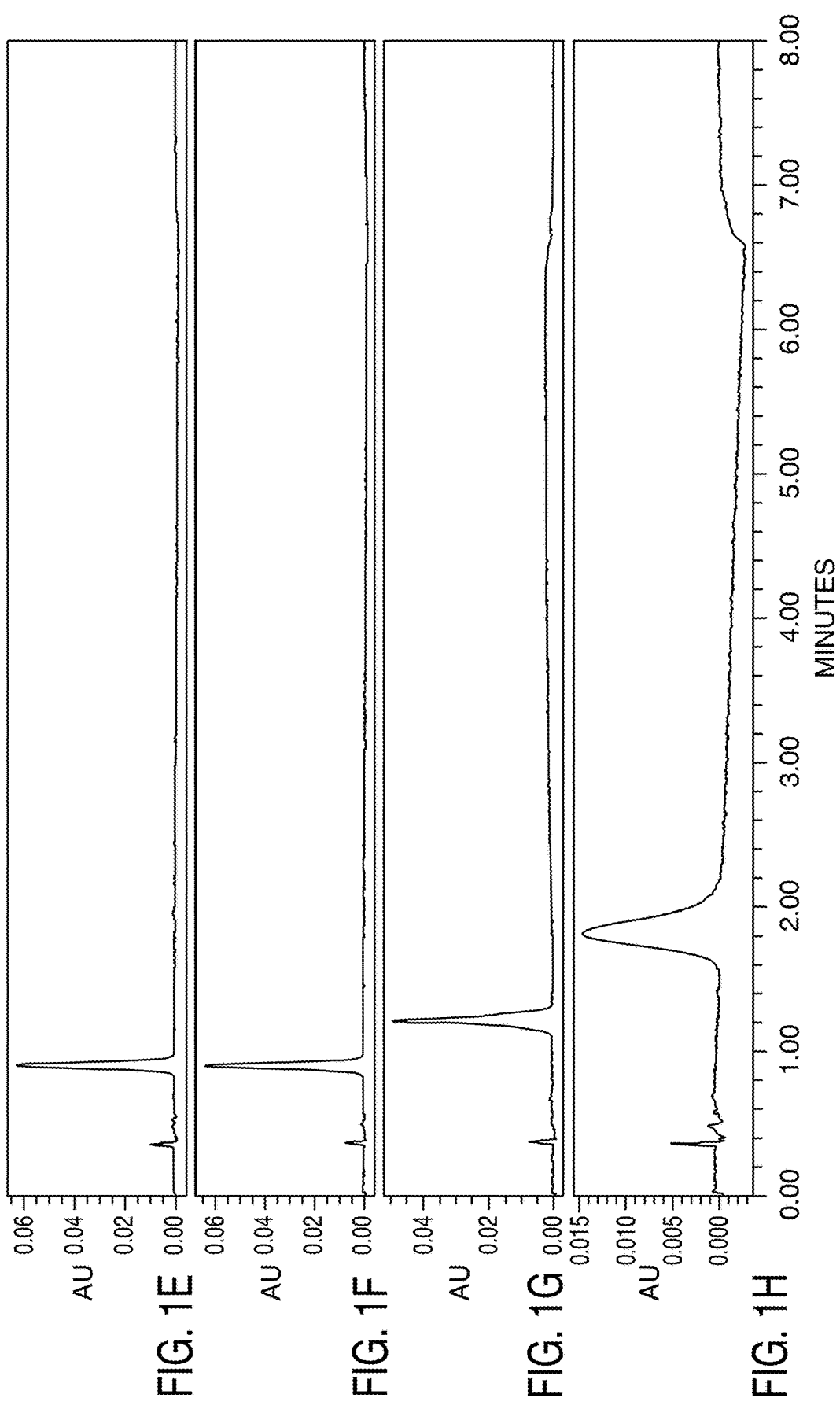

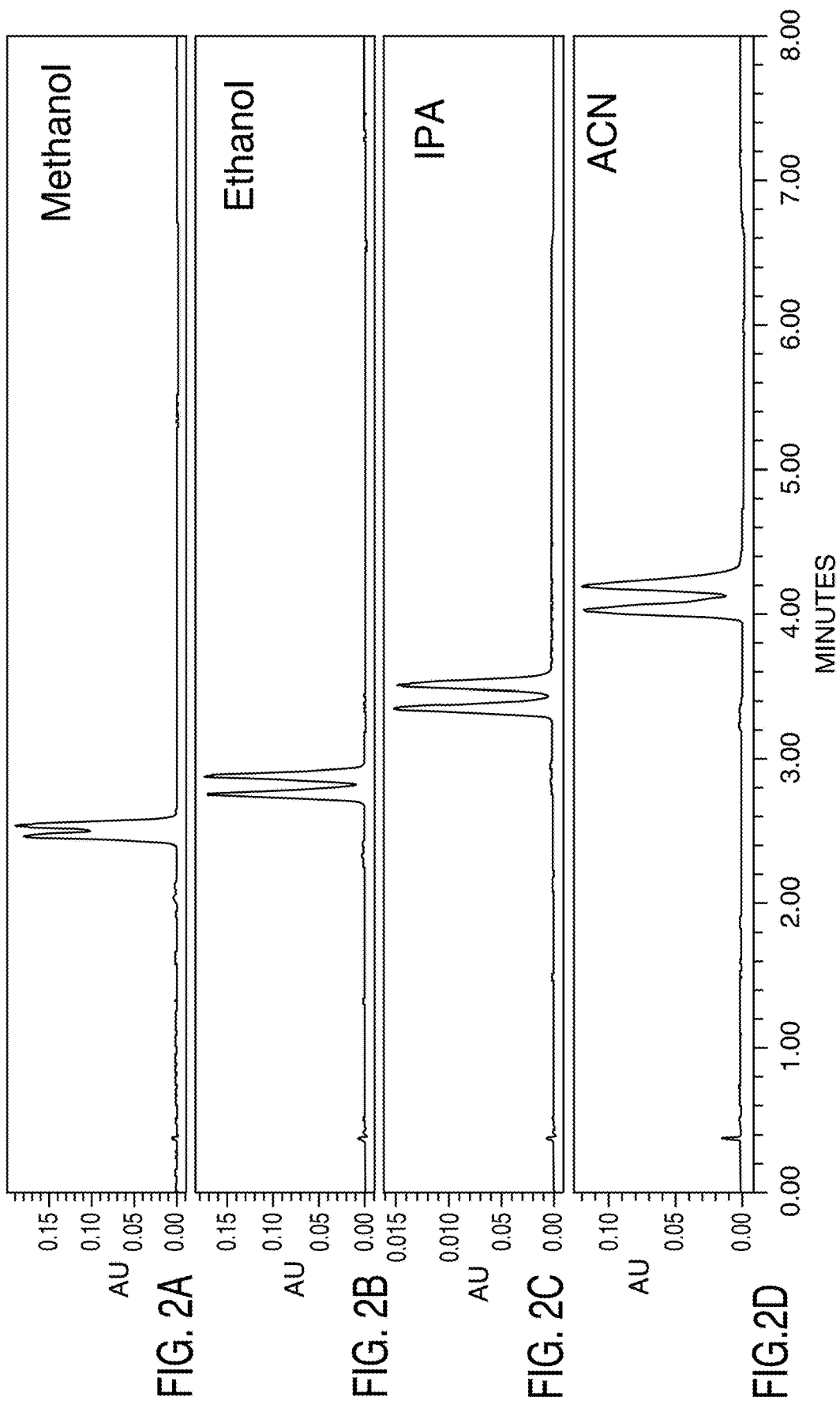

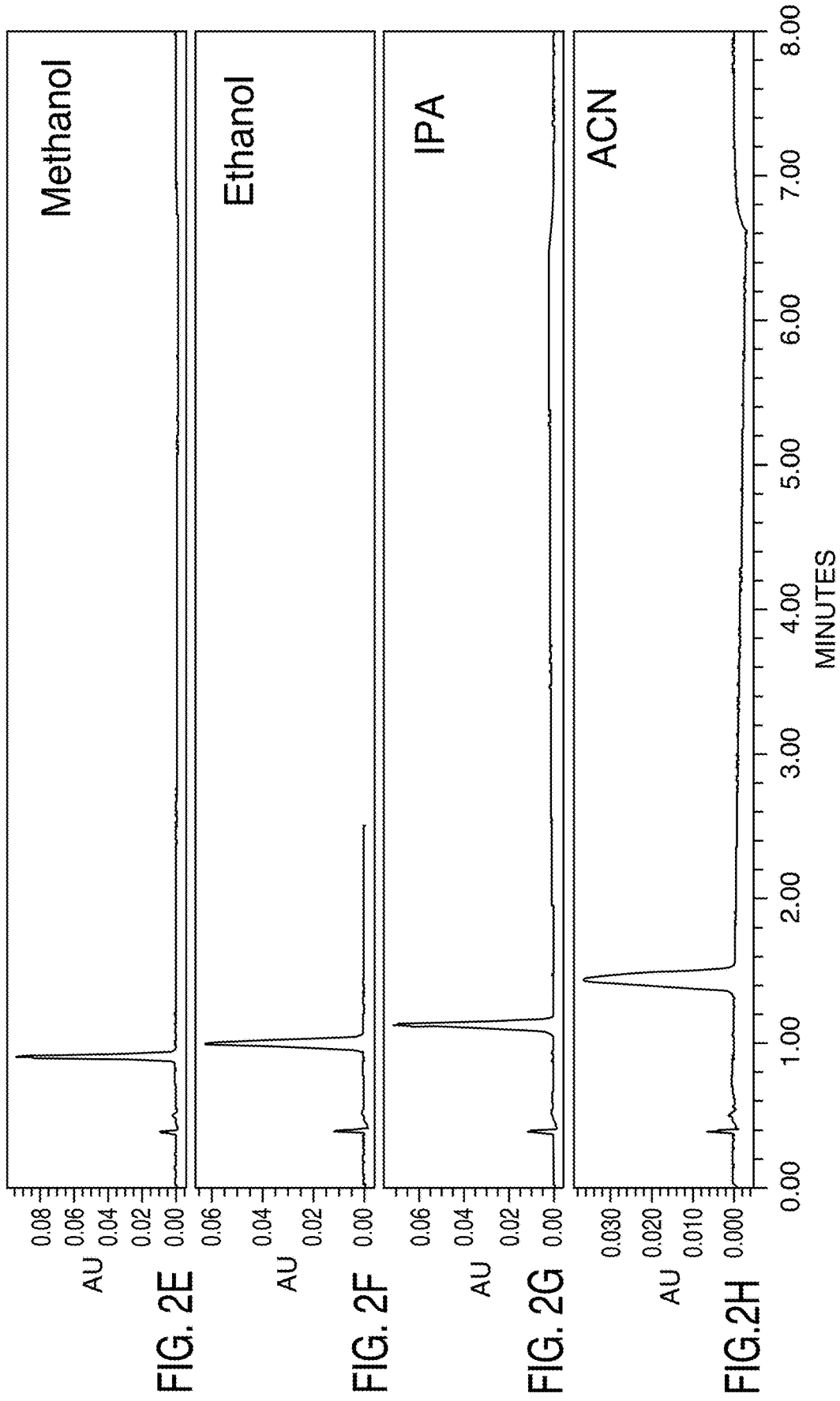

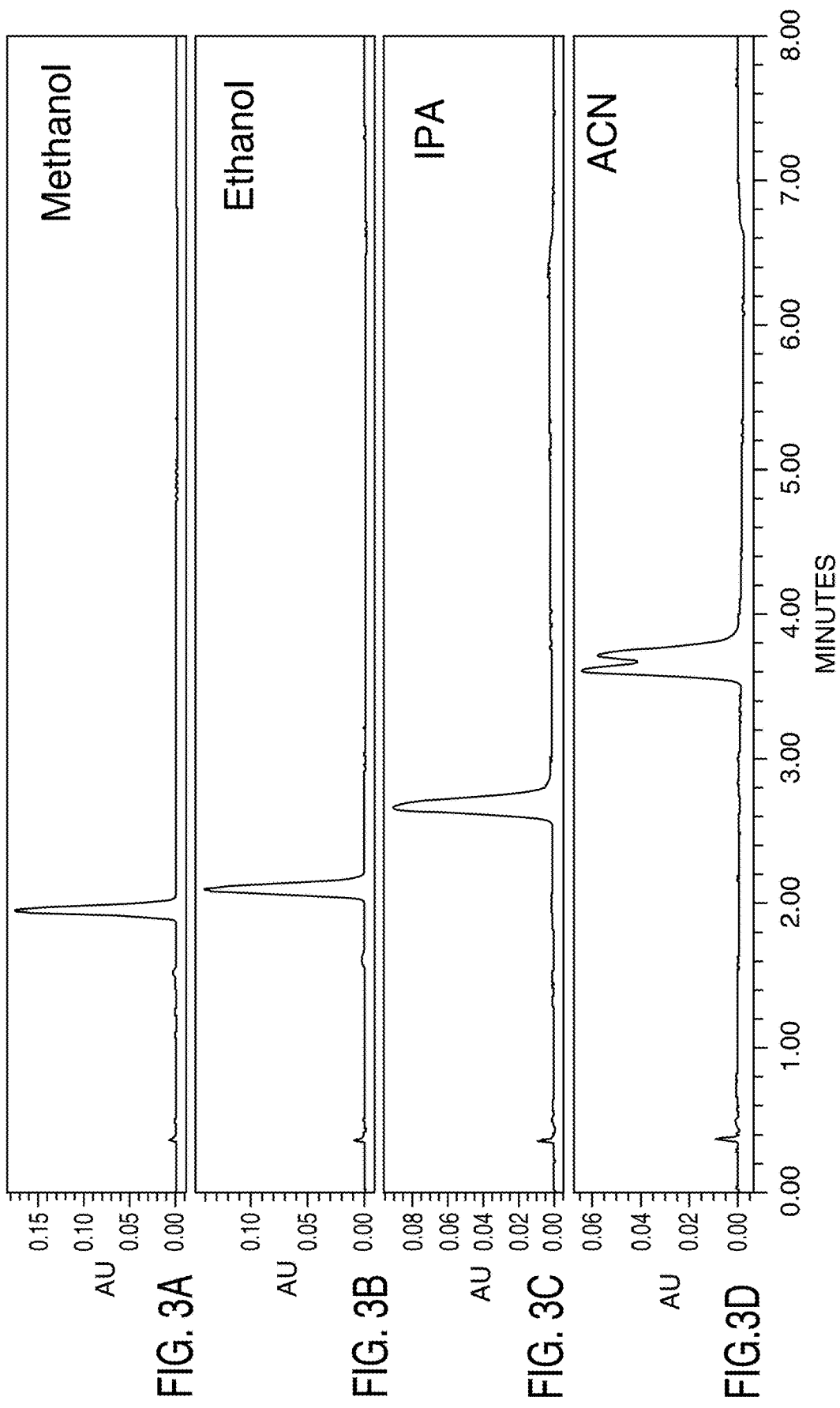

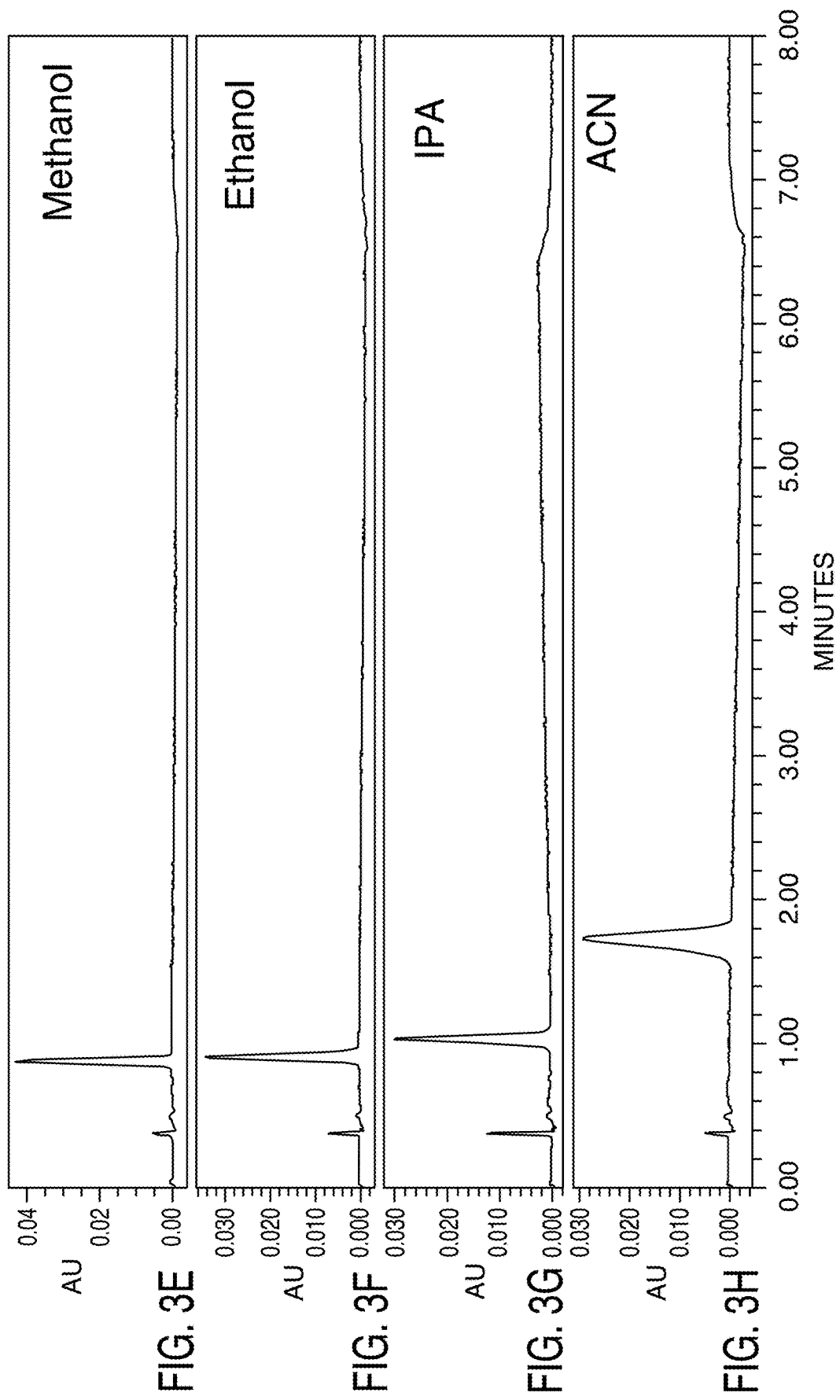

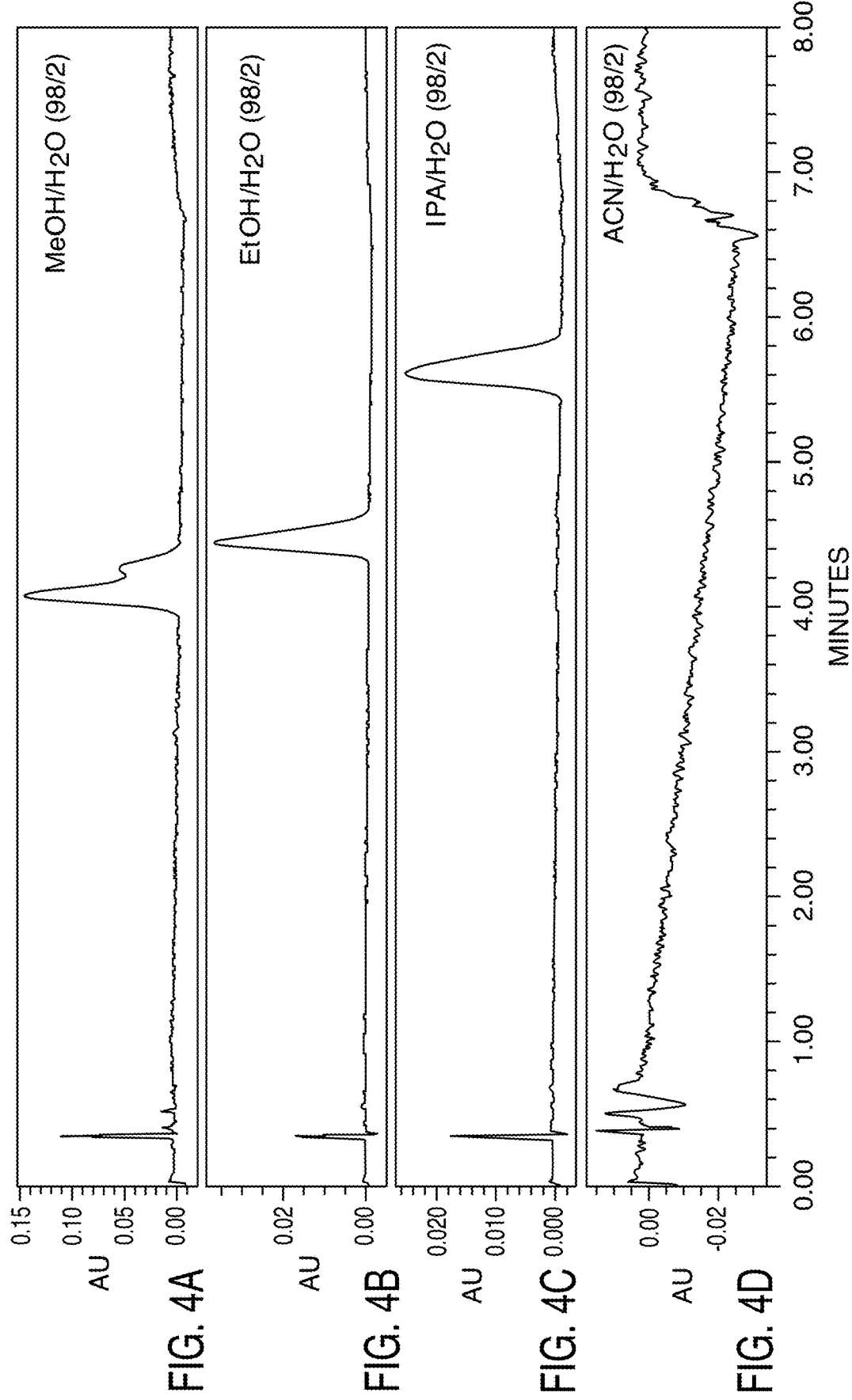

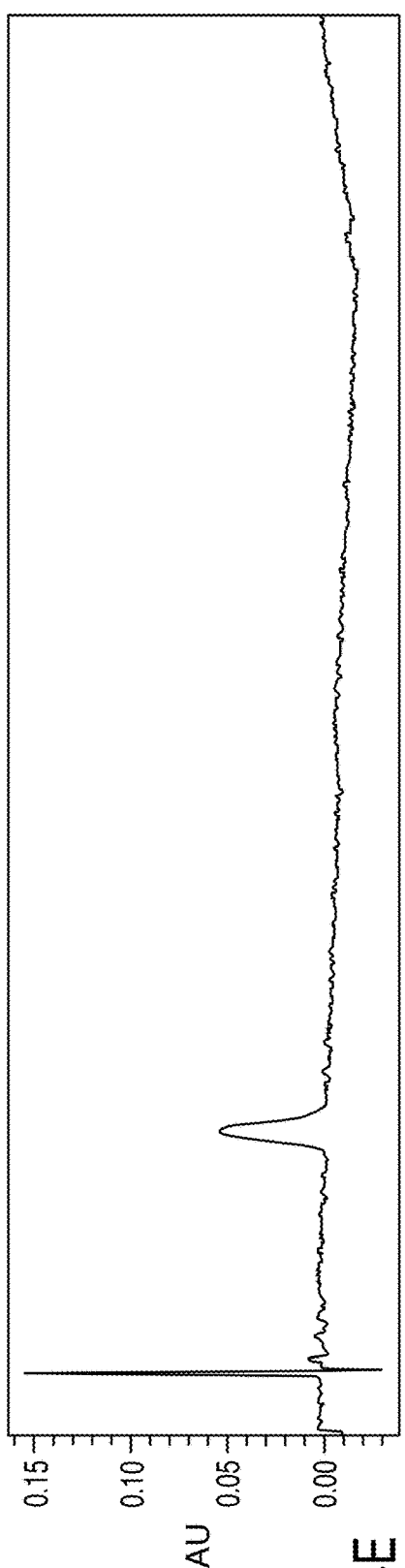
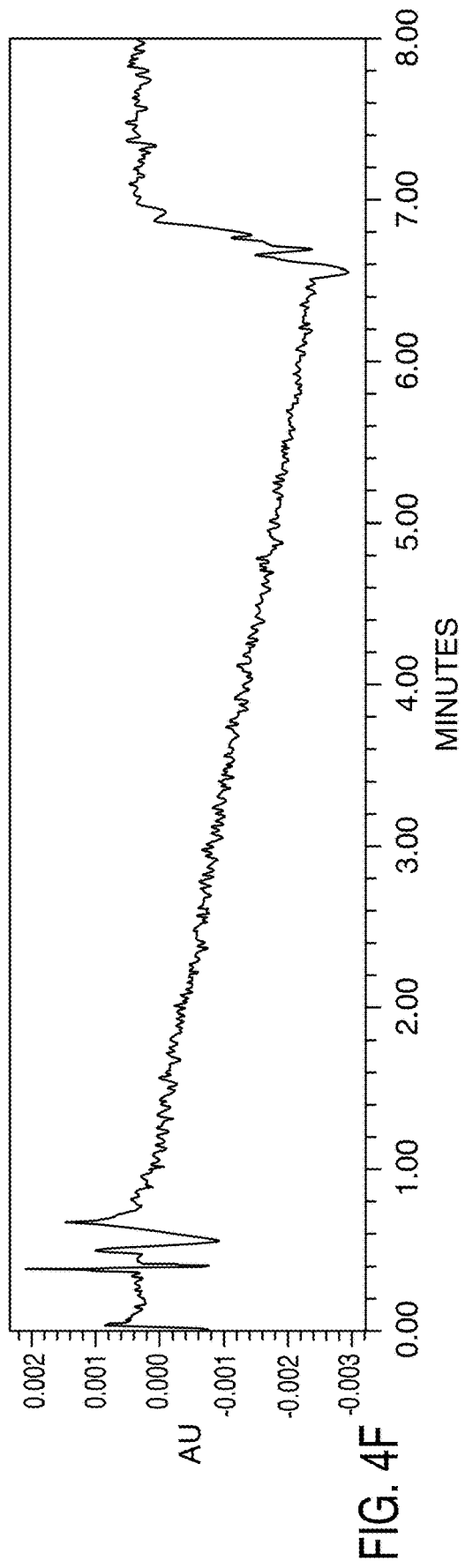
FIG. 4E
FIG. 4F

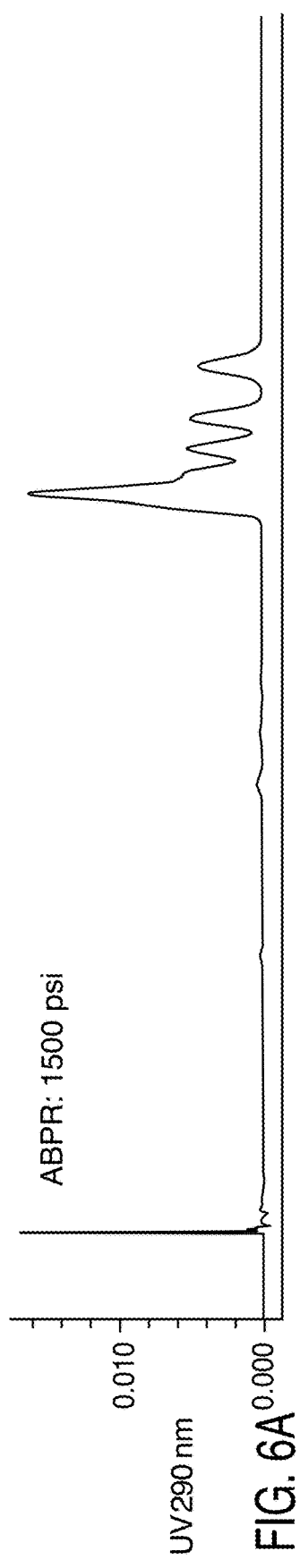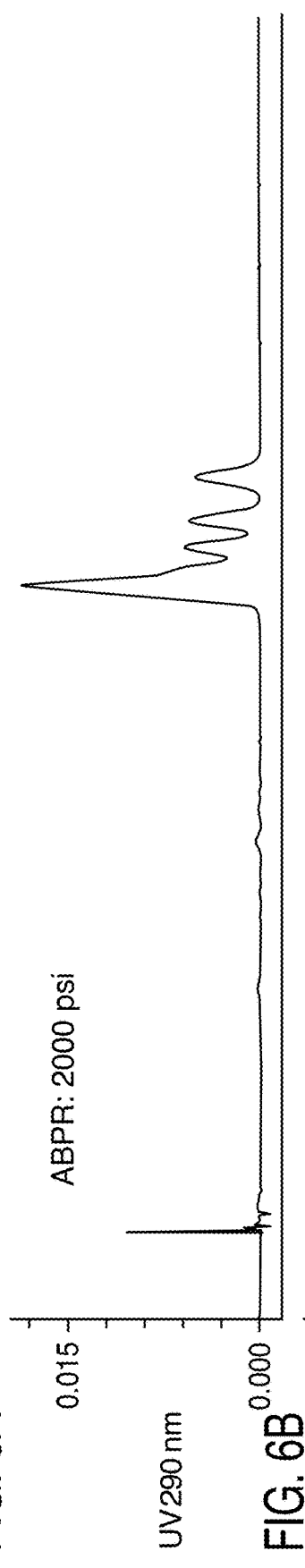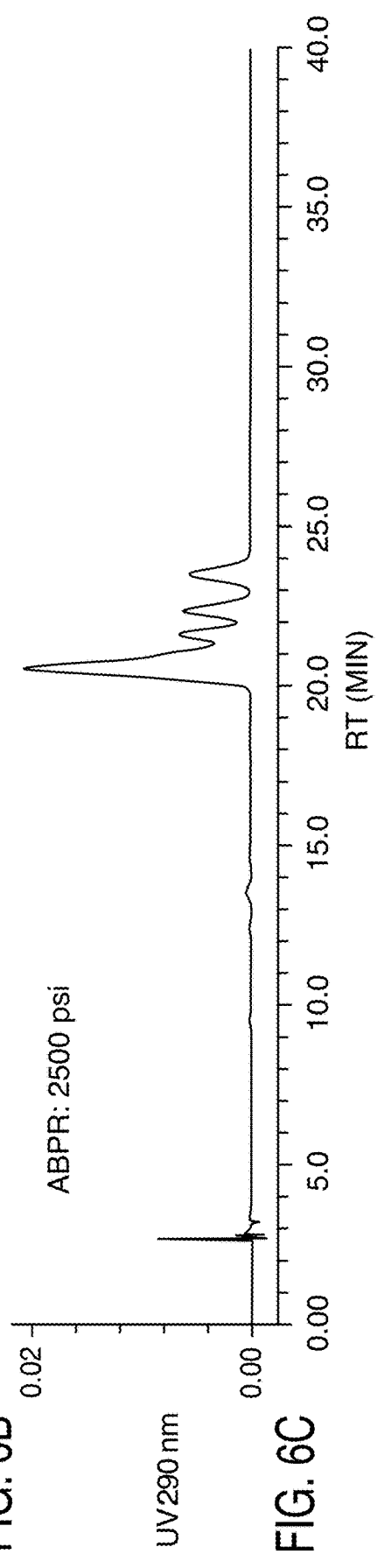

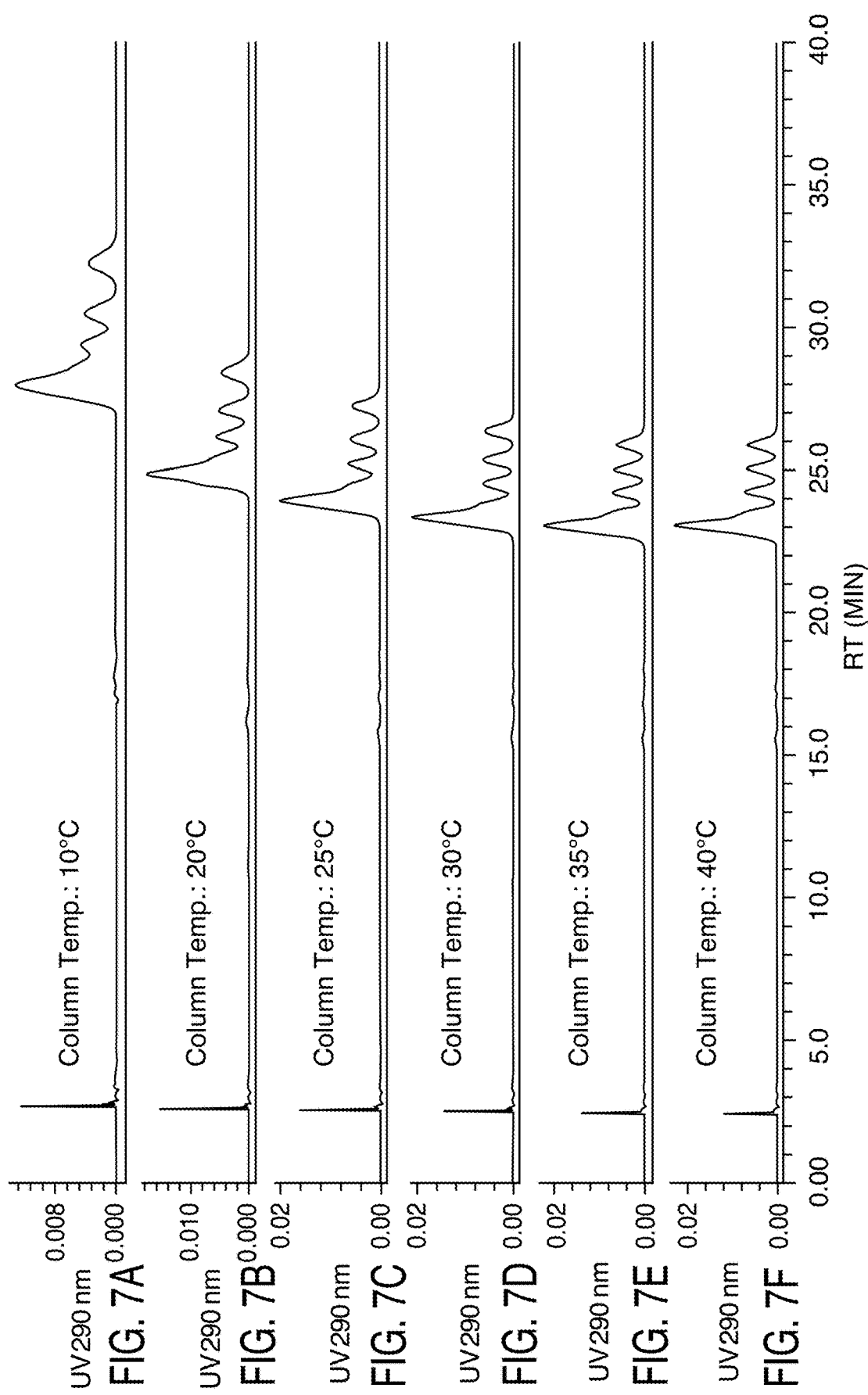

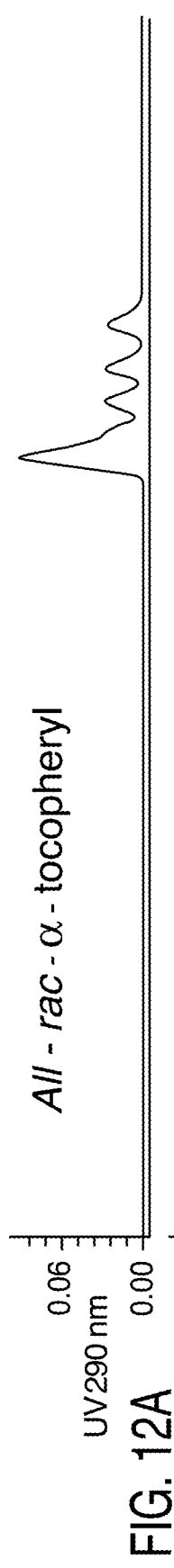
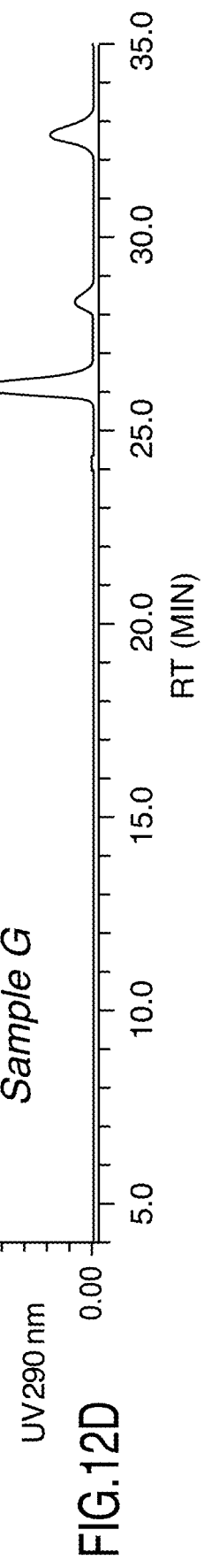
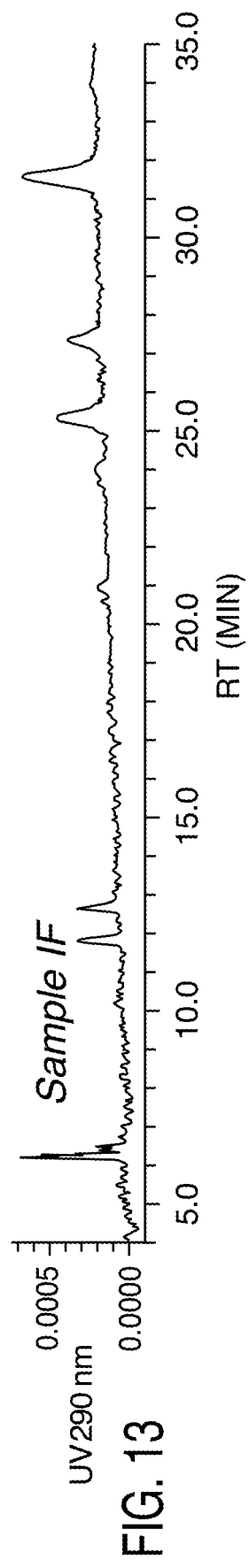
FIG. 12A, FIG. 12B, FIG. 12C, FIG. 12D, FIG. 13

DIFFERENTIATION OF NATURAL VITAMIN E FROM SYNTHETIC VITAMIN E AND QUANTIFICATION OF TOCOPHEROLS BY SUPERCRITICAL FLUID CHROMATOGRAPHY

CROSS-REFERENCE TO RELATED APPLICATIONS

This application claims benefit and priority to U.S. Provisional Application No. 63/017,994, filed Apr. 30, 2020, the content of which is incorporated herein by reference in its entirety.

TECHNICAL FIELD

The present disclosure relates to methods for the separation and quantitation of enantiomers of vitamin E using supercritical fluid chromatography (SFC) or carbon dioxide ($CO_2$)-based chromatography on various columns (e.g., chiral columns). The present disclosure further relates to a method for the identification of α-tocopherol as of natural or synthetic origin.

BACKGROUND

Vitamin E is an essential vitamin that functions as a chain-breaking antioxidant in the body by preventing the spread of free radical reactions. Previously, the generic term "vitamin E" comprised the four tocopherols (α, β, γ, and δ-tocopherol) as well as the four tocotrienols (α, β, γ, and δ-tocotrienol; Scientific opinion on dietary reference values for vitamin E as α-tocopherol, EFSA Journal 2015; 13(7): 4149). Structures of the four tocopherols are provided in Formula I (depicted as the RRR-enantiomer) and accompanying Table 1.

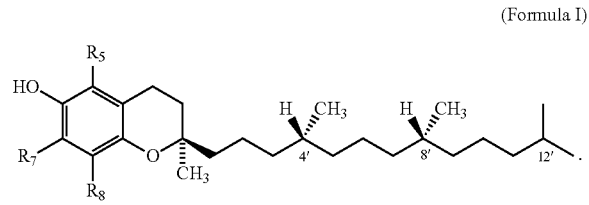

(Formula I)

TABLE 1

| | Tocopherols | | |
|---|---|---|---|
| Compound | $R_5$ | $R_7$ | $R_8$ |
| α-tocopherol | $CH_3$ | $CH_3$ | $CH_3$ |
| β-tocopherol | $CH_3$ | H | $CH_3$ |
| γ-tocopherol | H | $CH_3$ | $CH_3$ |
| δ-tocopherol | H | H | $CH_3$ |

The four tocopherols are differentiated on the basis of the substituents at positions 5, 7, and 8 on the chromane ring system (H or $CH_3$). Each of the tocopherols has three chiral centers: position 2 on the chromane ring system, and positions 4' and 8' in the side chain (Formula I). Thus, there are eight potential stereoisomers of each tocopherol. Currently, however, only the naturally occurring RRR-α-tocopherol (IUPAC Name: (2R)-2,5,7,8-tetramethyl-2-[(4R,8R)-(4,8, 12-trimethyltridecyl)]chroman-6-ol; CAS #59-02-9) is considered to be the physiologically active vitamer, as blood α-tocopherol concentrations are maintained by the preferential binding of α-tocopherol (compared to the other tocopherols or tocotrienols) by the α-tocopherol transfer protein (α-TTP; Hosomi et al., Affinity for alpha-tocopherol transfer protein as a determinant of the biological activities of vitamin E analogs. FEES Letters 409, 105-108, 1997).

Commercially available forms of α-tocopherol include the natural form (RRR-α-tocopherol, formerly D-α-tocopherol), and the synthetic form (all-rac-α-tocopherol, formerly DL-α-tocopherol), which has all eight stereoisomers of α-tocopherol present in equal proportions (RRR-, RRS-, RSR-, and RSS-, and their enantiomers SSS-, SSR-, SRS-, and SRR-). Among chemically synthesized α-tocopherol forms, only the 2R-α-tocopherol stereoisomers (i.e., RRR-, RRS-, RSR-, RSS-) were found to meet human vitamin E requirements because the 2S-stereoisomers (i.e., SSS-, SSR-, SRS-, SRR-) present in all-rac-α-tocopherol possess low affinity to α-TTP and are rapidly metabolized in the liver (Weiser et al. Stereoisomers of alpha-tocopheryl acetate. II. Biopotencies of all eight stereoisomers, individually or in mixtures, as determined by rat resorption-gestation tests, International Journal for Vitamin and Nutrition Research 52, 351-370, 1982).

Based on the relative bioactivity of all-rac-α-tocopherol, the regulatory bodies define 1 mg of all-rac-α-tocopherol as equal to 0.5 mg RRR-a-tocopherol (Institute of Medicine 2000, Dietary reference intakes for vitamin C, vitamin E, selenium and carotenoids. Food and Nutrition Board. National Academy Press, Washington, D.C., USA, 531 pp; Otten, et al. (Ed.), Dietary Reference Intakes: the essential guide to nutrient requirements, $1^{st}$ ed., National Academies Press, Washington D.C., 2006, pp. 235-241; European Food Safety Authority 2015. Scientific opinion on dietary reference values for vitamin E as α-tocopherol EFSA Journal 2015; 13(7):4149; Food Labeling: Revision of the Nutrition and Supplement Facts Labels, FDA, HHS, Federal Register/ Vol. 81, No. 103/Friday, May 27, 2016/Rules and Regulations). For food nutritional labeling purposes, depending on the form of the α-tocopherol, whether it is naturally occurring RRR-α-tocopherol, or synthetic all-rac-α-tocopherol, different conversion factors are used to calculate the α-tocopherol equivalent (α-TE). So far, however, there is no established standard method for the distinction of natural vitamin E (RRR-α-tocopherol and its ester forms) from synthetic vitamin E (all-rac-α-tocopherol and its ester forms). Record keeping of the source of the α-tocopherol is required for the estimation of the α-TE in foods or dietary supplements. Besides the food industry, the pharmaceutical industry also needs a method to check the purity of the α-tocopherol or its ester form in medicines. The source of vitamin E (either synthetic or natural) needs to be verified to ensure true vitamin E content consistent with the food label claim.

Separation of the stereoisomers of α-tocopherol is a complicated process. A recent review (Fu et al., Chromatographic separation of vitamin E enantiomers, Molecules 2017, 22, 233) provides a thorough summary regarding the chromatographic separation of vitamin E enantiomers. Normal-phase liquid chromatography (NPLC) has been successful in separating the stereoisomers using chiral columns. Id. All-rac-α-tocopherol can be separated into 2 peaks on different chiral columns (Mazzini et al., Configuration of the vitamin E analogue garcinoic acid extracted from Garcinia Kola seeds. Chirality 2009, 21, 519-524; Chen et al., Nanochitosan crosslinked with polyacrylamide as the chiral stationary phase for open-tubular capillary electrochromatography. Electrophoresis 2011, 32, 398-407). The ester form of α-tocopherol, the all-rac-α-tocopheryl acetate, can be separated into 2 or 4 peaks on different chiral columns under different conditions (Yamaguchi et al., Analysis of the stereoisomers of alpha-tocopheryl acetate by HPLC. Iyakuhin Kenkyu 1984, 15, 536-540). A commonly used NPLC method for the separation of all-rac-α-tocopherol involves derivatization of α-tocopherol to its methyl ether form, then separation into five peaks on a chiral column (Chiracel OD type with cellulose tris(3,5-dimethylphenyl-carbamate) as the stationary phase. See, e.g., Klaczkow et al., Determination of the stereoisomers of racemic alpha-tocopherol in pharmaceutical preparations by high-performance liquid chromatography and gas chromatography, Acta Pol. Pharm. 2008, 65, 715-721; Rey et al., Alpha-tocopherol stereoisomer analysis as discriminant method for distinguishing Iberian pig feed intake during the fattening phase, Food Chem. 2014, 142, 342-348; Meglia et al., Alpha-tocopherol concentration and stereoisomer composition in plasma and milk from dairy cows fed natural or synthetic vitamin E around calving, J. Dairy Res. 2006, 73, 227-234; Cortinas et al., Distribution of alpha-tocopherol stereoisomers in liver and thigh of chickens, Br. J. Nutr. 2004, 92, 295-301; Weiss et al., Relative bioavailability of all-rac and RRR-vitamin E based on neutrophil function and total alpha-tocopherol and isomer concentrations in periparturient dairy cows and their calves, J. Dairy Sci. 2009, 92, 720-731; and Rohde et al., Tocopherol stereoisomers in beef as an indicator of vitamin supplementation in cattle diets, Food Chem. 2011, 124, 935-940).

Gas chromatography (GC) has also been used to separate enantiomers (Vecchi et al., Chromatographische Trennung and quantitative Bestimmung aller acht Stereoisomeren von a-Tocopherol, Helv. Chim. Acta 1990, 73, 782-789; Riss et al., Separation of the eight stereoisomers of all-rac-alpha-tocopherol from tissues and plasma: Chiral phase high-performance liquid chromatography and capillary gas chromatography. Methods Enzymol. 1994, 234, 302-310; Weiser et al., Biodiscrimination of the eight alpha-tocopherol stereoisomers results in preferential accumulation of the four 2R forms in tissues and plasma of rats, J. Nutr. 1996, 126, 2539-2549). For example, α-tocopherol and α-tocopheryl acetate can be converted to ci-tocopheryl methyl ether, then separated by GC into 4 peaks. GC and LC methods have also been combined to further separate enantiomers. For example, it has been reported that fractions of sample were collected from NPLC separation, then the individual fractions were separated by GC, allowing separation of all 8 stereoisomers. Besides using chiral columns under NPLC conditions, it has been reported that all-rac-α-tocopherol can also be separated into multiple (3 to 4) peaks using a polymeric C18 column under special conditions (Yui et al., Distinction of synthetic dl-α-tocopherol from natural vitamin E (d-a-tocopherol) by reversed-phase liquid chromatography. Enhanced selectivity of a polymeric C18 stationary phase at low temperature and/or at high pressure, J. Chromatogr. A 1450, 2016, 45-52).

Supercritical fluid chromatography (SFC) has been a powerful tool for chiral separations (Speybroucka et al., Preparative supercritical fluid chromatography: A powerful tool for chiral separations J. Chromatogr. A 1467 (2016) 33-55), but this technology has only been used for the enrichment of tocopherols in wheat (Saito et al., Enrichment of tocopherols in wheat by directly coupled supercritical fluid extraction with semipreparative supercritical fluid chromatography, J. Chromatogr. Sci. 27, 1989, 79-85).

Currently, there is no method available for conducting routine analysis to differentiate natural vitamin E from synthetic vitamin E. Accordingly, there remains a need in the art for methods of separating stereoisomers of α-tocopherol and α-tocopheryl acetate.

SUMMARY

The present disclosure is generally directed to methods for the chiral separation of the stereoisomers of all-rac-α-tocopherol or all-rac-α-tocopheryl acetate. The benefits of the disclosed methods include short run time, simple sample treatment, and excellent separation of RRR-α-tocopherol from other stereoisomers.

Accordingly, in one aspect is provided a method for the chiral separation of stereoisomers of α-tocopherol or α-tocopheryl acetate in a sample, the method comprising:
 a. providing a sample comprising at least one stereoisomer of α-tocopherol or α-tocopheryl acetate;
 b. contacting said sample with a column chromatography device comprising a column having an interior portion at least partially filled with an immobilized stationary phase, wherein the immobilized stationary phase comprises amylose tris(3,5-dimethylphenylcarbamate), cellulose tris(3,5-dimethylphenylcarbamate), or cellulose tris(3-chloro-4-methylphenylcarbamate);
 c. flowing a mobile phase through the immobilized stationary phase for a period of time, the mobile phase comprising carbon dioxide; and
 d. eluting the at least one stereoisomer of α-tocopherol or α-tocopheryl acetate from the immobilized stationary phase in the mobile phase; and
 e. detecting the presence of the at least one stereoisomer of α-tocopherol or α-tocopheryl acetate using a detector.

In some embodiments, the column chromatography device further comprises a second column in fluid communication in a series arrangement with the first column, wherein the immobilized stationary phase in each column is the same.

In some embodiments, the sample comprises all-rac-α-tocopherol or all-rac-α-tocopheryl acetate. In some embodiments, the sample comprises RRR-α-tocopherol and other stereoisomers of α-tocopherol, the method comprising separating the RRR-α-tocopherol from the other stereoisomers of α-tocopherol. In some embodiments, the method comprises separating RRR-α-tocopherol from one or more of β, γ, and δ-tocopherol.

In some embodiments, the sample is a dietary supplement, a food, a food ingredient, a vitamin premix, a nutritional formula, or a medicine.

In some embodiments, the method further comprises dissolving the sample in isooctane.

In some embodiments, no sample derivatization is performed.

In some embodiments, the immobilized stationary phase comprises amylose tris(3,5-dimethylphenylcarbamate) or cellulose tris(3,5-dimethylphenylcarbamate).

In some embodiments, the period of time is about 35 minutes or less.

In some embodiments, the period of time is about 15 minutes or less.

In some embodiments, the eluting is performed under isocratic conditions.

In some embodiments, the eluting is performed under gradient conditions.

In some embodiments, the mobile phase further comprises a co-solvent. In some embodiments, the co-solvent is selected from the group consisting of methanol, ethanol, isopropanol, acetonitrile, water, and combinations thereof. In some embodiments, the co-solvent is present in the mobile phase in an amount up to about 15% by volume. In some embodiments, the co-solvent is methanol and water. In some embodiments, the mobile phase is $CO_2$ and 7% by volume of a mixture of methanol and water in a ratio by volume of 98:2. In some embodiments, the co-solvent is acetonitrile and water. In some embodiments, the mobile phase is $CO_2$ and 3% by volume of a mixture of acetonitrile and water in a ratio by volume of 98:2

In some embodiments, flowing the mobile phase through the immobilized stationary phase is performed at a flow rate from about 0.5 mL/min to about 2 mL/min.

In some embodiments, a column temperature is from about 10 to about 50° C.

In some embodiments, the detector measures ultraviolet absorbance.

In some embodiments, the method further comprises identifying the source of α-tocopherol as natural or synthetic.

In some embodiments, the sample comprises RRR-α-tocopherol, the method further comprising quantitatively determining a concentration of the RRR-α-tocopherol in the sample In some embodiments, the method further comprises converting any α-tocopheryl esters which may be present in said sample to α-tocopherol, wherein the converting comprises subjecting the sample to saponification conditions.

BRIEF DESCRIPTION OF THE DRAWINGS

In order to provide an understanding of embodiments of the technology, reference is made to the appended drawings, which are not necessarily drawn to scale. The drawings are exemplary only, and should not be construed as limiting the technology. The disclosure described herein is illustrated by way of example and not by way of limitation in the accompanying figures.

FIGS. 1A, 1B, 1C, and 1D depict exemplary chromatograms corresponding to separations of dl-α-tocopherol stereoisomers on a Trefoil AMY1 column using a variety of co-solvents according to non-limiting embodiments of the disclosure.

FIGS. 1E, 1F, 1G, and 1H depict exemplary chromatograms corresponding to separations of dl-α-tocopheryl acetate stereoisomers on a Trefoil AMY1 column using a variety of co-solvents according to non-limiting embodiments of the disclosure.

FIGS. 2A, 2B, 2C, and 2D depict exemplary chromatograms corresponding to separations of dl-α-tocopherol stereoisomers on a Trefoil CEL1 column using a variety of co-solvents according to non-limiting embodiments of the disclosure.

FIGS. 2E, 2F, 2G, and 2H depict exemplary chromatograms corresponding to separations of dl-α-tocopheryl acetate stereoisomers on a Trefoil CEL1 column using a variety of co-solvents according to non-limiting embodiments of the disclosure.

FIGS. 3A, 3B, 3C, and 3D depict exemplary chromatograms corresponding to separations of dl-α-tocopherol stereoisomers on a Trefoil CEL2 column using a variety of co-solvents according to non-limiting embodiments of the disclosure.

FIGS. 3E, 3F, 3G, and 3H depict exemplary chromatograms corresponding to separations of dl-α-tocopheryl acetate stereoisomers on a Trefoil CEL2 column using a variety of co-solvents according to non-limiting embodiments of the disclosure.

FIGS. 4A, 4B, 4C, and 4D depict exemplary chromatograms corresponding to separations of dl-α-tocopherol stereoisomers on a Trefoil AMY1 column using a variety of co-solvents according to non-limiting embodiments of the disclosure.

FIGS. 4E and 4F depict exemplary chromatograms corresponding to separations of dl-α-tocopheryl acetate stereoisomers on a Trefoil AMY1 column using a variety of co-solvents according to non-limiting embodiments of the disclosure.

FIGS. 6A, 6B, and 6C depict exemplary chromatograms corresponding to separations of dl-α-tocopherol stereoisomers on a Trefoil AMY1 column using a variety of back pressures according to non-limiting embodiments of the disclosure.

FIGS. 7A, 7B, 7C, 7D, 7E, and 7F depict exemplary chromatograms corresponding to separations of dl-α-tocopherol stereoisomers on a Trefoil AMY1 column using a variety of column temperatures according to non-limiting embodiments of the disclosure.

FIGS. 12A, 12B, 12C and 12D depict exemplary chromatograms corresponding to separation and quantitation of dl-α-tocopherol stereoisomers present in a standard (FIG. 12A) and dietary supplement samples (FIGS. 12B, 12C and 12D) according to non-limiting embodiments of the disclosure.

FIG. 13 depicts an exemplary chromatogram corresponding to a separation and determination of natural vitamin E as present in an infant formula sample according to a non-limiting embodiment of the disclosure.

DETAILED DESCRIPTION

Figure 5A:
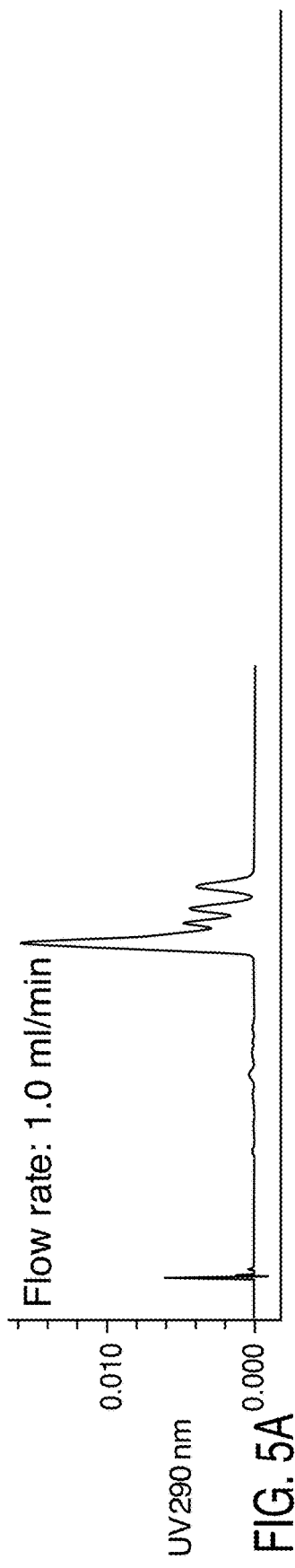
FIGS. 5A, 5B, and 5C depict exemplary chromatograms corresponding to separations of dl-α-tocopherol stereoisomers on a Trefoil AMY1 column using a variety of flow rates according to non-limiting embodiments of the disclosure.

Before describing several example embodiments of the technology, it is to be understood that the technology is not limited to the details of construction or process steps set forth in the following description. The technology is capable of other embodiments and of being practiced or being carried out in various ways.

Definitions

With respect to the terms used in this disclosure, the following definitions are provided. This application will use the following terms as defined below unless the context of the text in which the term appears requires a different meaning.

The articles "a" and "an" are used herein to refer to one or to more than one (i.e., to at least one) of the grammatical object of the article. The term "about" used throughout this specification is used to describe and account for small fluctuations. For example, the term "about" can refer to less than or equal to ±5%, such as less than or equal to ±2%, less than or equal to ±1%, less than or equal to ±0.5%, less than or equal to ±0.2%, less than or equal to ±0.1% or less than or equal to ±0.05%. All numeric values herein are modified by the term "about," whether or not explicitly indicated. A value modified by the term "about" of course includes the specific value. For instance, "about 5.0" must include 5.0.

Embodiments of the present disclosure are now described in detail as methods for performing chiral super critical fluid chromatography (SFC) with the understanding that such methods are exemplary methods. Such methods constitute what the inventors now believe to be the best mode of practicing the technology. Those skilled in the art will recognize that such methods are capable of modification and alteration.

Provided herein are analytical methods for the separation of isomers of vitamin E. Specifically, the methods of the present technology have been developed which allow for the direct analysis of α-tocopherol or α-tocopheryl acetate depending on the specific chromatographic conditions. The results disclosed herein for the methods illustrate the effect of chromatography conditions such as flow rate, co-solvent, automatic back pressure regulation (ABPR), and column temperature on the separations. The methods are based on a highly pressure-controlled carbon dioxide-based chromatography system ($UPC^2$ commercially available from Waters Corporation, Milford, Mass.) combined with UV detection technology. Carbon dioxide-based chromatography uses $CO_2$ as the primary mobile phase. The use of $CO_2$ as the primary mobile phase greatly reduces organic solvent waste compared to normal phase liquid chromatography methods. Advantageously, the disclosed methods do not require sample derivatization (e.g., methylation of the phenolic hydroxyl group). The only treatment required for samples (e.g., dietary supplement samples) is dilution in an appropriate solvent prior to injection into the chromatographic system.

The methods can be used for the determination of α-tocopherol, and are free from interference from other tocopherols. The methods can also be used to separate and quantify other tocopherols (e.g., β, γ, and δ-tocopherol) simultaneously while separating and quantifying the stereoisomers of α-tocopherol. Since naturally occurring α-tocopherol is exclusively RRR-α-tocopherol, and synthetic α-tocopherol contains equal amounts of all eight possible stereoisomers, the disclosed methods may further comprise differentiating the source of an α-tocopherol as natural or synthetic. Using the disclosed methods, for the first time, food and dietary supplement manufacturers are able to routinely verify the source of the vitamin E in their vitamin ingredient and final products as natural or synthetic. Besides the qualitative determination of the source of the α-tocopherol, the disclosed methods can be used to quantitatively determine the concentration of RRR-α-tocopherol in samples including, but not limited to, dietary supplements, foods, food ingredients, vitamin premixes, nutritional formulas, or medicines.

The disclosed methods provide excellent linearity ($R^2$ of 0.999), accuracy, sensitivity, and precision in the analysis of tocopherols in such samples.

In one aspect, the present technology is directed to methods for the chiral separation of stereoisomers of α-tocopherol or α-tocopheryl acetate in a sample. The methods generally comprise providing a sample comprising at least one stereoisomer of α-tocopherol or α-tocopheryl acetate and eluting the sample through an immobilized stationary phase with a mobile phase. The various stereoisomers of α-tocopherol or α-tocopheryl acetate which may be present are at least partially separated and eluted in the mobile phase, and detected using an appropriate detector.

The methods may be utilized for the analysis of a wide variety of samples. In some embodiments, the sample is a dietary supplement, a food, a food ingredient, or a medicine. In some embodiments, the sample comprises all-rac-α-tocopherol or all-rac-α-tocopheryl acetate.

The methods do not require derivatization of the sample prior to analysis. For example, the phenolic hydroxyl group of any tocopherol isomers present in the sample is not converted to an ether (e.g., a methyl ether) prior to analysis. Generally, the only pre-analysis processing which may be required is to dilute the sample to provide an appropriate concentration of analyte (e.g., steroisomers of α-tocopherol or α-tocopheryl acetate) prior to injection into the chromatographic system. Is some embodiments, the diluent is isooctane.

Suitable immobilized stationary phases include chemically modified starches such as alkylphenyl carbamates of cellulose or amylose. In some embodiments, the immobilized stationary phase comprises amylose tris(3,5-dimethylphenylcarbamate) or cellulose tris(3,5-dimethylphenylcarbamate). Suitable columns containing such immobilized stationary phase materials include Trefoil AMY1, CEL1, and CEL2, available from Waters Technologies Corporation, Milford Mass.

In some embodiments, a single column containing the immobilized stationary phase is utilized. In other embodiments, more than one column is connected in series, such as two columns, three, columns, four columns, five columns, or six columns. In some embodiments, two columns, both at least partially filled with the same immobilized stationary phase material, are used in series. Without wishing to be bound by theory, it is believed that in certain embodiments, the longer overall length of stationary phase material provided by using columns in series may allow a better quality of separation between stereoisomers of α-tocopherol present in the sample.

The mobile phase may vary, but generally comprises as the major component super critical fluid carbon dioxide ($CO_2$). In some embodiments, the mobile phase further comprises a co-solvent. Suitable cosolvents include alcohols, polar organic solvents, water, and combinations thereof. In some embodiments, the co-solvent is selected from the group consisting of methanol, ethanol, isopropanol, acetonitrile, water, and combinations thereof. In some embodiments, the co-solvent is acetonitrile and water. In some embodiments, the co-solvent is methanol and water. When two co-solvents are present, the ratio of the two co-solvents by volume may vary. For example, the ratio by volume of the two co-solvents may be from about 99:1 to about 1:99. In some embodiments, the ratio by volume of an organic co-solvent (e.g., an alcohol or acetonitrile) to water is about 99:1, about 98:2, about 97:3, about 96:4, about 95:5, about 94:6, about 93:7, about 92:8, about 91:9, or about 90:10. In particular embodiments, the ratio of the organic co-solvent (e.g., an alcohol or acetonitrile) to water is about 98:2. In specific embodiments, the co-solvent is 98:2 acetonitrile-water or 98:2 methanol-water.

The concentration of the co-solvent in the mobile phase may vary. In some embodiments, the co-solvent is present in the mobile phase in an amount up to about 15% by volume, such as about 1%, about 2%, about 3%, about 4%, about 5%, about 6%, about 7%, about 8%, about 9%, about 10%, about 11%, about 12%, about 13%, about 14%, or about 15% by volume. In some particular embodiments, the mobile phase is 97% $CO_2$ and 3% by volume of a mixture of acetonitrile and water in a ratio by volume of 98:2. In some particular embodiments, the mobile phase is 93% $CO_2$ and 7% by volume of a mixture of methanol and water in a ratio by volume of 98:2.

The elution may be performed under isocratic conditions (i.e., where the mobile phase composition remains constant during the separation) or under gradient conditions (i.e., where the mobile phase composition changes during the course of the separation). For example, under gradient conditions, the mobile phase may initially consist of $CO_2$, or an initial concentration of co-solvent in $CO_2$, and gradually increase the relative amount of co-solvent present over the duration of the elution period. In particular embodiments, the eluting is performed under isocratic conditions.

The rate of flow of the mobile phase through the immobilized stationary phase may vary according to desired run time, sample components, mobile phase constituents, column identity and size, and desired back pressure, for example. In some embodiments, the flow rate is from about 0.5 mL/min to about 2 mL/min. In some embodiments, the flow rate is about 1 mL/min, about 0.7 mL/min, or about 0.5 mL/min.

The duration of the elution (i.e., the run time) required to at least partially separate and fully elute all analyte present (i.e., the one or more isomers or stereoisomers of tocopherol which may be present) may vary depending on many factors, including, but not limited to, the particular isomers present, the flow rate, mobile phase composition, column size and material, and the like. In some embodiments, the period of time for elution is about 35 minutes or less, such as about 35 minutes, about 30 minutes, about 25 minutes, about 20 minutes, about 15 minutes, about 10 minutes, or about 5 minutes. In some embodiments, the run time for analysis of tocopherol stereoisomers is about 35 minutes. In some embodiments, the run time for analysis of tocopheryl acetate stereoisomers is about 15 minutes.

The temperature of the column during the elution may vary. For example, in some embodiments, the column temperature is from about 10 to about 50° C., such as about 10, about 20, about 30, about 40, or about 50° C. In some embodiments, the column temperature is from about 20 to about 40° C., or is about 30° C.

The method of detection of the one or more isomers or stereoisomers of tocopherol may vary. Suitable methods include UV absorbance, UV fluorescence, or mass spectrometry. In some embodiments, the method of detection is by ultraviolet absorbance. The wavelength of UV light monitored may vary. For example, in some embodiments, the UV wavelength is from about 284 to about 290 nm. In some embodiments, the wavelength is 284 nm or 290 nm. Such wavelengths are suitable for detection of α-tocopherol and α-tocopheryl acetate, respectively.

In some embodiments, the method for separation of α-tocopherol stereoisomers comprises isocratic elution on an amylose tris-(3,5-dimethylphenylcarbamate) immobilized stationary phase using as the eluant 93% $CO_2$ and 7% of a 98:2 (v/v) mixture of methanol and water. In this particular embodiment, all-rac-α-tocopherol may be separated into four chromatographic peaks of equal area, with one of the chromatographic peaks corresponding to RRR-α-tocopherol.

As described herein above, the disclosed methods may be utilized for the separation and/or detection of the presence of one or more stereosiomers of α-tocopherol or an α-tocopheryl ester, such as the acetate. The alcohol form (tocopherol) and the acetate form (tocopheryl acetate) of vitamin E are the two common forms used to fortify food products to enhance their nutritional content. Other ester forms, such as α-tocopheryl succinate, may also be used to fortify food products. Stereoisomeric α-tocopherol esters, such as α-tocopheryl acetate, may be at least partially separated (e.g., into two or more chromatographic peaks) according to the disclosed method.

Accordingly, in some embodiments, the disclosed methods comprise separation of α-tocopheryl acetate stereoisomers. In some embodiments, the methods for separation of α-tocopheryl acetate stereoisomers comprise isocratic elution on a cellulose tris-(3,5-dimethylphenylcarbamate) immobilized stationary phase using as the eluant 97% $CO_2$ and 3% of a 98:2 (v/v) mixture of acetonitrile and water. In this particular embodiment, all-rac-α-tocopheryl acetate may be separated into two chromatographic peaks of equal area, with one of the chromatographic peaks corresponding to RRR-α-tocopheryl acetate.

Alternatively, in order to separate and quantify additional tocopherol stereoisomers which may be present in a sample comprising α-tocopherol esters, the esters can be converted to the alcohol form (i.e., saponified) prior to performing the separation and analysis. Accordingly, in some embodiments, the methods further comprise converting any α-tocopheryl esters which may be present in said sample to α-tocopherol, wherein the converting comprises subjecting the sample to saponification conditions. In such embodiments further comprising saponification, multiple chromatographic peaks corresponding to various α-tocopherol stereoisomers which may be present in the sample are obtained.

As described herein above, the presence of primarily or solely the presence of RRR-α-tocopherol is indicative of the source of vitamin E in a sample as of natural origin. Accordingly, in some embodiments, the methods further comprise identifying the source of α-tocopherol as natural or synthetic based on the presence of RRR-α-tocopherol alone or in the presence of other stereoisomers, respectively. In some embodiments, the methods further comprise quantitatively determining a concentration of the RRR-α-tocopherol in the sample. Such embodiments may be useful in confirming label claims to vitamin E content in relevant samples, or otherwise ascertaining potency of vitamin E in relevant samples.

All methods described herein can be performed in any suitable order unless otherwise indicated herein or otherwise clearly contradicted by context. The use of any and all examples, or exemplary language (e.g., "such as") provided herein, is intended merely to better illuminate the materials and methods and does not pose a limitation on the scope unless otherwise claimed. No language in the specification should be construed as indicating any non-claimed element as essential to the practice of the disclosed materials and methods.

It will be readily apparent to one of ordinary skill in the relevant arts that suitable modifications and adaptations to the compositions, methods, and applications described herein can be made without departing from the scope of any embodiments or aspects thereof. The compositions and methods provided are exemplary and are not intended to limit the scope of the claimed embodiments. All of the various embodiments, aspects, and options disclosed herein can be combined in all variations. The scope of the compositions, formulations, methods, and processes described herein include all actual or potential combinations of embodiments, aspects, options, examples, and preferences herein.

Although the technology herein has been described with reference to particular embodiments, it is to be understood that these embodiments are merely illustrative of the principles and applications of the present technology. It will be apparent to those skilled in the art that various modifications and variations can be made to the methods and apparatus of the present technology without departing from the spirit and scope of the technology. Thus, it is intended that the present technology include modifications and variations that are within the scope of the appended claims and their equivalents.

Reference throughout this specification to "one embodiment," "certain embodiments," "one or more embodiments" or "an embodiment" means that a particular feature, structure, material, or characteristic described in connection with the embodiment is included in at least one embodiment of the technology. Thus, the appearances of phrases such as "in one or more embodiments," "in certain embodiments," "in one embodiment" or "in an embodiment" in various places throughout this specification are not necessarily referring to the same embodiment of the technology. Furthermore, the particular features, structures, materials, or characteristics may be combined in any suitable manner in one or more embodiments. Any ranges cited herein are inclusive.

Aspects of the present technology are more fully illustrated with reference to the following examples. Before describing several exemplary embodiments of the technology, it is to be understood that the technology is not limited to the details of construction or process steps set forth in the following description. The technology is capable of other embodiments and of being practiced or being carried out in various ways. The following examples are set forth to illustrate certain aspects of the present technology and are not to be construed as limiting thereof.

EXAMPLES

The present invention may be further illustrated by the following non-limiting examples describing the chromatographic devices and method.

Materials

The following reagents and samples included dl-α-tocopherol, d-α-tocopherol, dl-α-tocopheryl acetate, d-α-tocopheryl acetate, δ-tocopherol, γ-tocopherol, tocopherol mix, and d-α-tocotrienol. All were purchased from Sigma-Aldrich (St. Louis, Mo.). Dietary supplement samples were purchased locally at various stores.

General Method

All standard solutions were prepared in amber vials. A stock standard solution of dl-α-tocopherol was prepared by weighing an amount of standard into a vial (recorded to within 0.01 mg), then mixing with an amount of isooctane. One eighth of the weight of the dl-α-tocopherol was used as the weight of RRR-α-tocopherol in the concentration (dl-α-tocopherol contains 8 stereoisomers with equal proportion). Working standard solutions were prepared by a serial dilution of the stock standard solution.

Samples used for analyses were in a soft gel form. The soft gels were cut and the liquid inside was taken and dissolved in isooctane. The sample solutions were filtered with a 0.2 mm PTFE membrane filter. Then they were further diluted 10 fold with isooctane and mixed well before they were ready for analysis. The concentrations in all standard and sample solutions were expressed in mg per g (mg/g).

Chromatography was performed on a $CO_2$-based chromatography system (ACQUITY UPC$^2$ system with ACQUITY PDA Detector; Available from Waters Technologies Corporation, Milford Mass.). Columns used included Waters Trefoil AMY1, CEL1, and CEL2 (3×150 mm, 2.5 mm). Trefoil AMY1: Amylose tris(3,5-dimethylphenylcarbamate). Trefoil CEL1: Cellulose tris-(3,5-dimethylphenylcarbamate). Trefoil CEL2: Cellulose tris-(3-chloro-4-methylphenylcarbamate). The detector wavelength was 290 nm for α-tocopherol, and 284 nm for α-tocopheryl acetate. The UV Detection mode was absorbance, compensated with wavelength resolution of 6.0 nm. The column temperature was 30° C. Mobile phases used were $CO_2$ with additives as indicated elsewhere below. Screening co-solvents included methanol, acetonitrile, ethanol, and isopropanol. Flow rate was 0.5 mL/min or 1.0 ml/min, or as indicated elsewhere. Elution mode was isocratic elution or gradient elution with linear gradient from 5% to 15% of co-solvents in 6 min. Automatic back pressure regulation was set at 2000 psi.

Example 1. Screening Study-AMY1 Column with Various Co-Solvents

Screening studies were performed according to the general method described herein above and using a Waters Trefoil AMY1 column. Representative chromatograms corresponding to separations of dl-α-tocopherol stereoisomers using a variety of co-solvents are provided in FIGS. 1A-D (methanol, ethanol, isopropanol, and acetonitrile, respectively). Representative chromatograms corresponding to separations of dl-α-tocopheryl acetate stereoisomers using a variety of co-solvents are provided in FIGS. 1E-H (methanol, ethanol, isopropanol, and acetonitrile, respectively).

Example 2. Screening Study-CEL1 Column with Various Co-Solvents

Screening studies were performed according to the general method described herein above and using a Waters Trefoil CEL1 column. Representative chromatograms corresponding to separations of dl-α-tocopherol stereoisomers using a variety of co-solvents are provided in FIGS. 2A-D (methanol, ethanol, isopropanol, and acetonitrile, respectively). Representative chromatograms corresponding to separations of dl-α-tocopheryl acetate stereoisomers using a variety of co-solvents are provided in FIGS. 2E-H (methanol, ethanol, isopropanol, and acetonitrile, respectively).

Example 3. Screening Study-CEL2 Column with Various Co-Solvents

Screening studies were performed according to the general method described herein above and using a Waters Trefoil CEL2 column. Representative chromatograms corresponding to separations of dl-α-tocopherol stereoisomers using a variety of co-solvents are provided in FIGS. 3A-D (methanol, ethanol, isopropanol, and acetonitrile, respectively). Representative chromatograms corresponding to separations of dl-α-tocopheryl acetate stereoisomers using a variety of co-solvents are provided in FIGS. 3E-H (methanol, ethanol, isopropanol, and acetonitrile, respectively).

Example 4. Screening Study-AMY1 Column with 2% Water and Various Co-Solvents

Screening studies were performed according to the general method described herein above and using a Waters Trefoil AMY1 column. Representative chromatograms corresponding to separations of dl-α-tocopherol stereoisomers using a variety of co-solvents are provided in FIGS. 4A-D (98:2 methanol/water, 98:2 ethanol/water, 98:2 isopropanol/water, and 98:2 acetonitrile/water, respectively). Representative chromatograms corresponding to separations of dl-α-tocopheryl acetate stereoisomers using a variety of co-solvents are provided in FIGS. 4E and 4F (98:2 isopropanol/water, and 98:2 acetonitrile/water, respectively).
Summary of Screening Study Results for Examples 1-4

For the chiral separation of dl-α-tocopherol, the Trefoil AMY1 column with a methanol-water mixture (98:2 v/v) showed promising results. A shoulder peak and a main peak were obtained for the dl-α-tocopherol. The CEL1 column also showed promising results with the tested co-solvents. Two peaks of equal intensity were obtained for the dl-α-tocopherol. For the chiral separation of the acetate form (dl-α-tocopheryl acetate), no evidence of separation was observed on any of the three columns with the four co-solvents tested. However, a longer retention and an asymmetric peak shape was obtained when acetonitrile was used as the co-solvent on the various columns.

Example 5. Method Development for dl-α-Tocopherol Separation-AMY1 Column

Figure 5B:
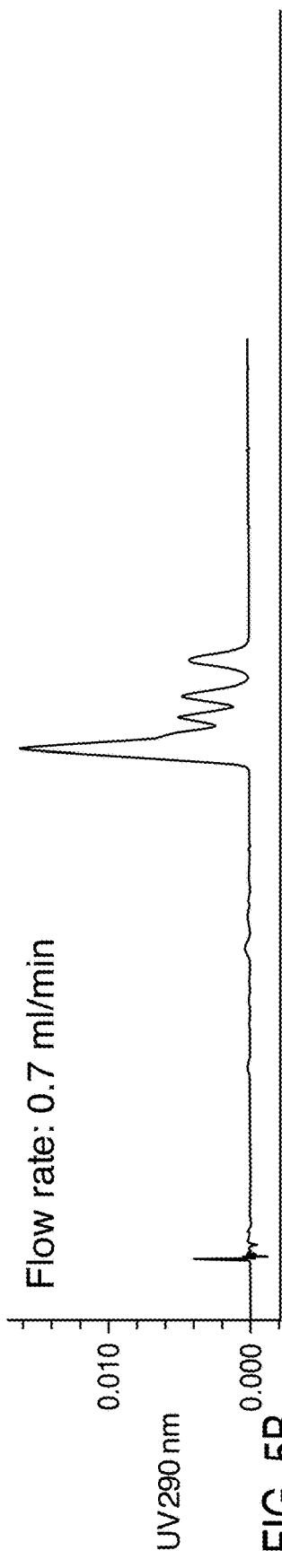
Figure 5C:
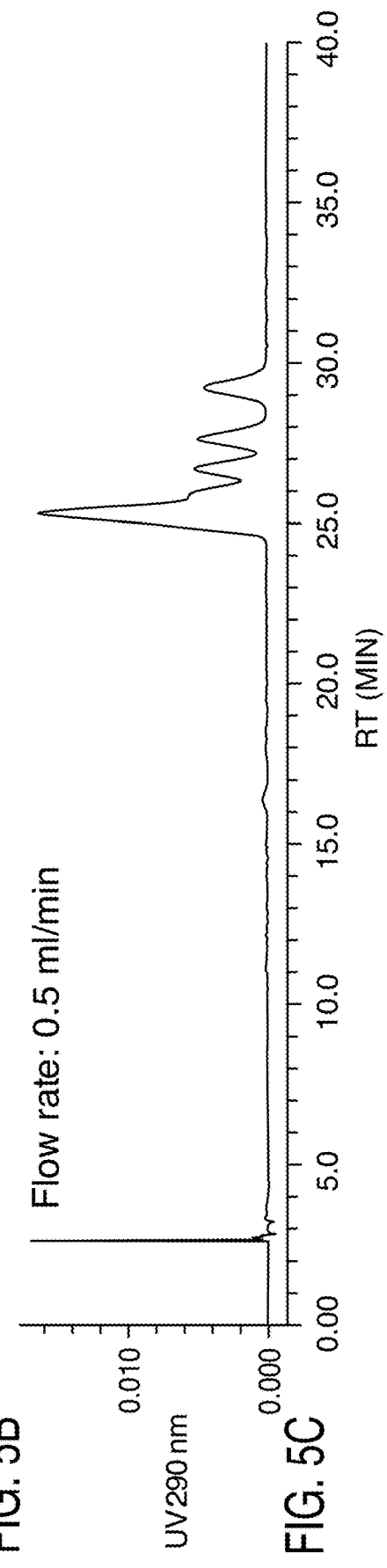

Screening studies were performed according to the general method described herein above and using a Waters Trefoil AMY1 column. The conditions tested for the chiral separation of dl-α-tocopherol included:
Water content in methanol as co-solvent (0%, 2%, and 10%).
ABPR pressures of 1500, 2000, and 2500 psi.
Column temperature of 10, 20, 30, and 40° C.
Flow rate from 0.5-2 ml/min.
Under the following conditions, four peaks were obtained for dl-α-tocopherol:
Isocratic elution with 93% $CO_2$ and 7% $MeOH/H_2O$ (98/2 v/v).
ABPR at 1500 psi.
Column temperature at 30° C.
Flow rate at 0.5 ml/min.
The following general results were observed during this study:
Better resolution was obtained at lower flow rates (FIG. 5A versus FIGS. 5B and 5C).
Better resolution was obtained at the lowest back pressure (FIG. 6A versus FIGS. 6B and 6C).
Increasing column temperature improved the separation resolution at temperatures from 10° C. to 30° C. (FIGS. 7A to 7D); however, above about 30° C., the improvement in resolution appeared marginal (FIGS. 7E and 7F).

Example 6. Method Development for dl-α-Tocopherol Separation-CEL1 Column

The conditions tested for the chiral separation of dl-α-tocopherol on the CEL1 column included methanol/water (98/2 v/v) as co-solvent. Under the following conditions, two equal intensity peaks were obtained for dl-α-tocopherol:
Isocratic elution with 93% $CO_2$ and 7% $MeOH/H_2O$ (98/2 v/v).
ABPR at 1500 psi.
Column temperature at 30° C.
Flow rate at 0.5 ml/min.

Figure 8A:
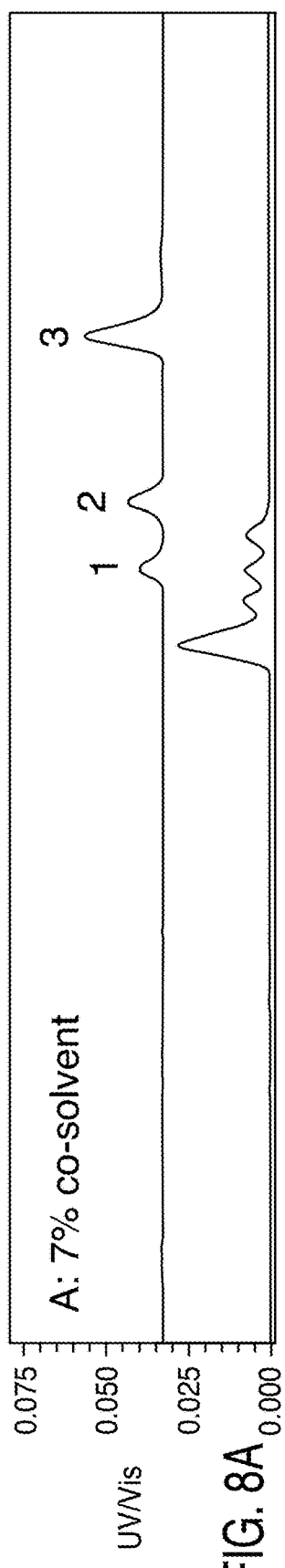
FIGS. 8A, 8B, and 8C depict exemplary chromatograms corresponding to separations of dl-α-tocopherol stereoisomers on a Trefoil AMY1 column using various percentages of co-solvent in the mobile phase according to non-limiting embodiments of the disclosure.
Figure 8B:
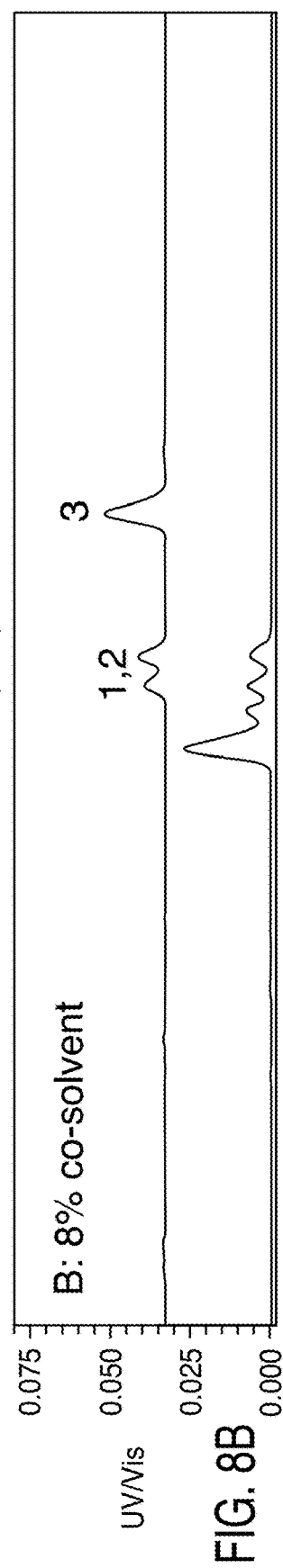
Figure 8C:
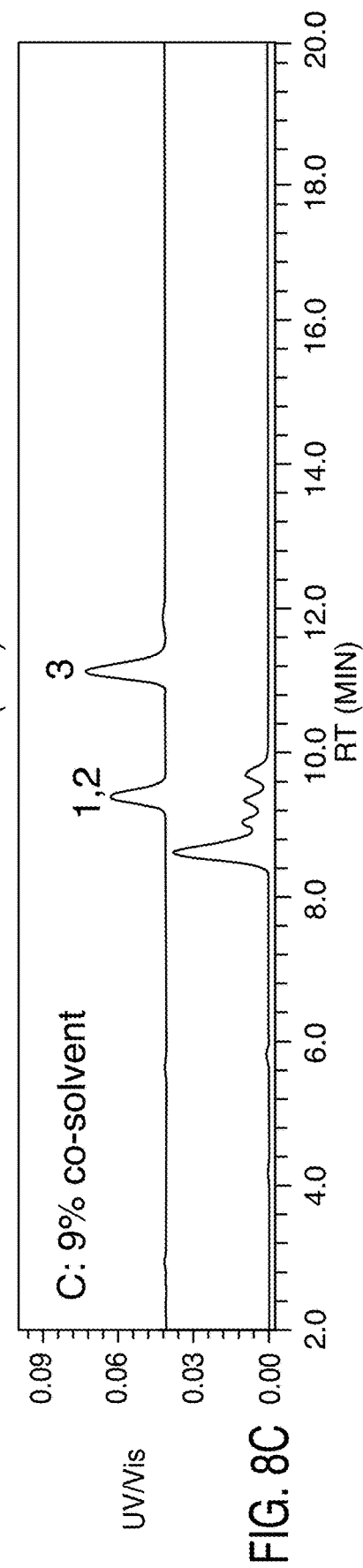

Example 7. Method Development for dl-α-Tocopherol Separation in the Presence of Other Isomers Other tocopherols such as δ- or γ-tocopherol may be present in samples and could potentially interfere with separation of the stereoisomers of α-tocopherol. Accordingly, separations were performed on mixtures of tocopherol standards with all-rac-α-tocopherol using different amounts of co-solvent (98/2 v/v methanol-water) relative to $CO_2$. The results are provided in FIGS. 8A, 8B, and 8C (7, 8, and 9% co-solvent, respectively). With 8% co-solvent in the mobile phase, the δ-tocopherol co-eluted with one stereoisomer of all-rac-α-tocopherol. With 9% co-solvent, the δ-tocopherol co-eluted with RRR-α-tocopherol.

Example 8. Method Development for dl-α-Tocopheryl Acetate Separation

Figure 9A:
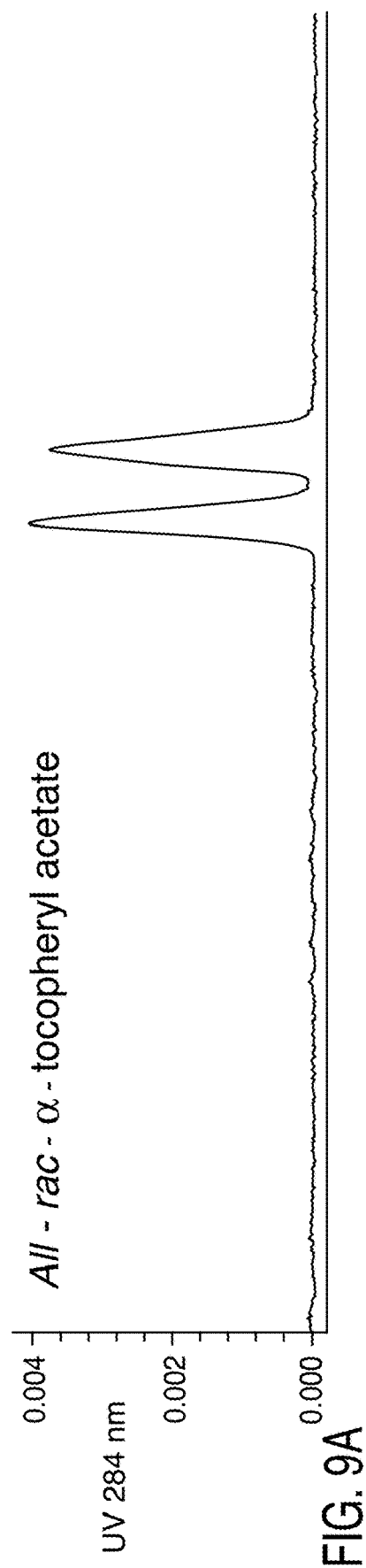
FIG. 9A depicts an exemplary chromatogram corresponding to separation of dl-α-tocopheryl acetate stereoisomers on a Trefoil CEL1 column according to a non-limiting embodiment of the disclosure.
Figure 9B:
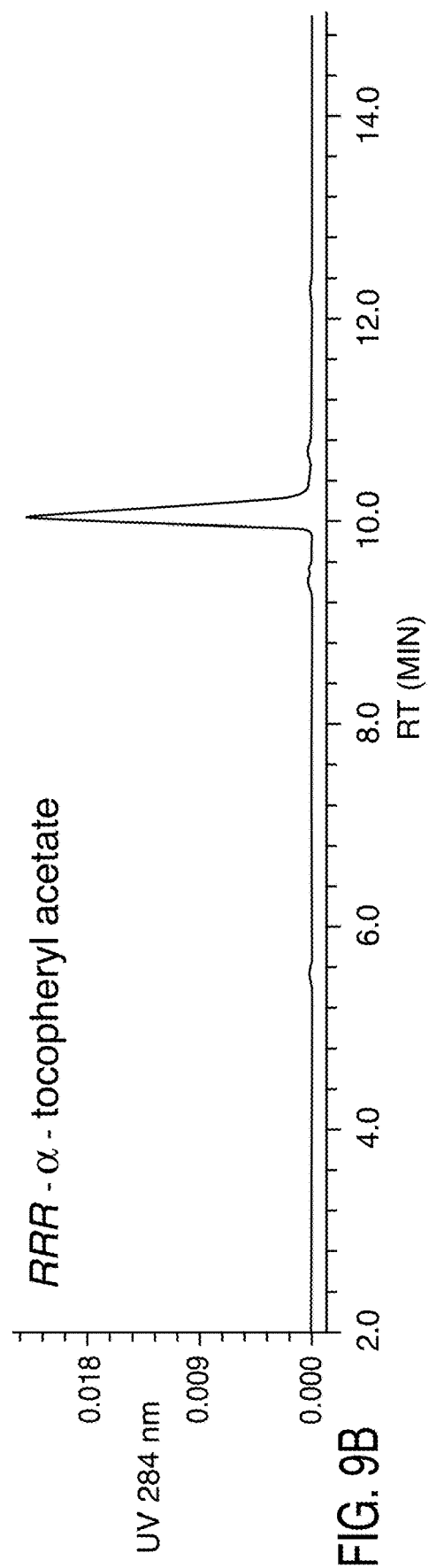
FIG. 9B depicts an exemplary chromatogram for RRR-α-tocopheryl acetate on a Trefoil CEL1 column according to a non-limiting embodiment of the disclosure.

Separations of dl-α-tocopheryl acetate stereoisomers were performed on AMY1 and CEL1 columns using various mixtures of isopropanol, acetonitrile, and water as co-solvents, and varying conditions such as ABPR pressure, column temperature, the quantity of co-solvent in the mobile phase, and flow rate. As shown in FIG. 9A, dl-α-tocopheryl acetate was separated into two equally sized peaks under the following conditions:
Column: Trefoil CEL1 (2.5 mm 3×150 mm)×2 (i.e., 2 columns in series).
Mobile phase: 97% $CO_2$ and 3% co-solvent.
Co-solvent: 98/2 v/v acetonitrile/water.
Elution: Isocratic at a flow rate of 1 ml/min.
ABPR: 1500 psi.
Column temp.: 30° C.
Injection Volume: 2 ml
Detection: UV at 284 nm with 6 nm UV resolution (compensate reference 390-445 nm)
FIG. 9B shows a chromatogram of reference RRR-α-tocopheryl acetate.

Example 9. Method Performance Evaluation

Figure 10:
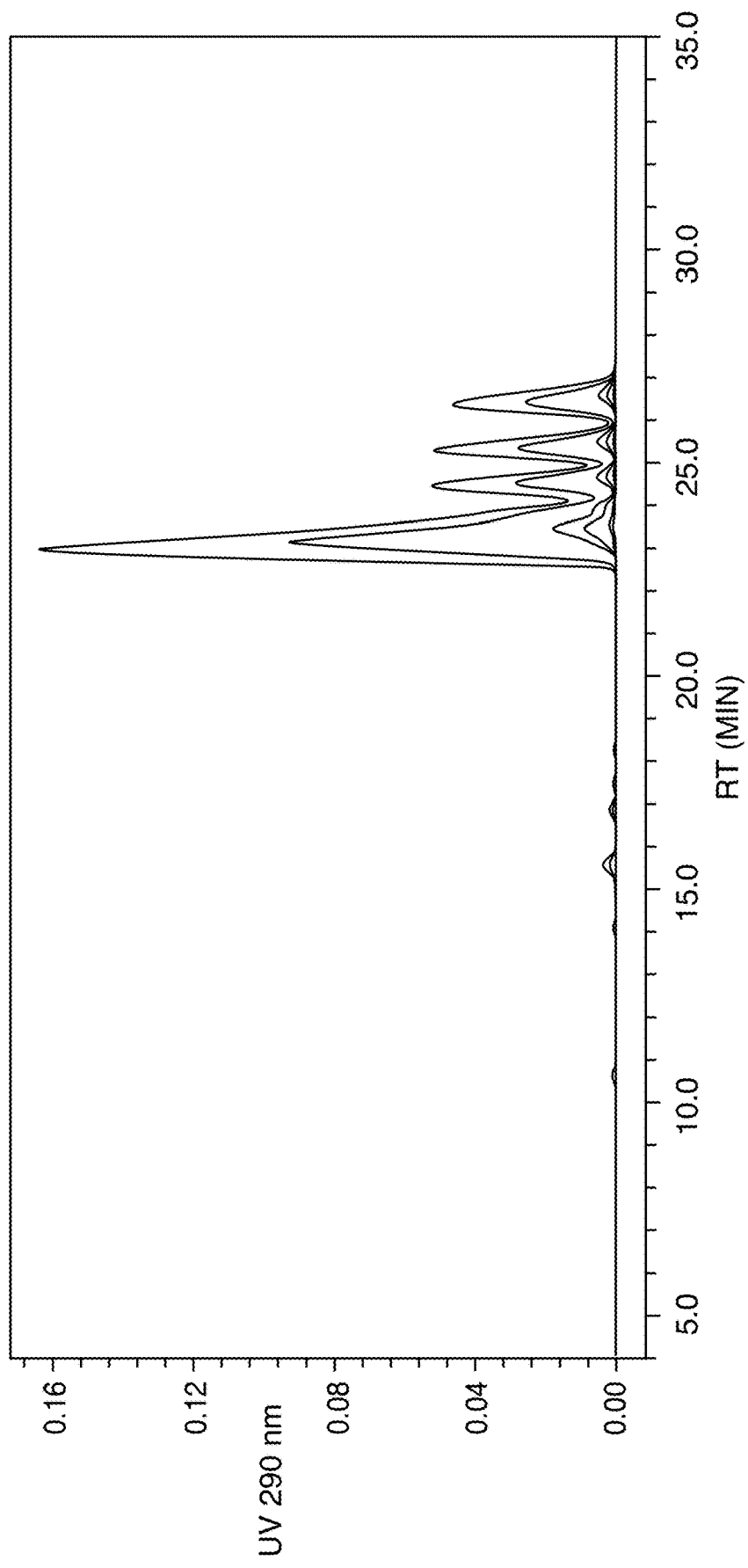
FIG. 10 depicts an overlay of exemplary chromatograms corresponding to separations of dl-α-tocopherol stereoisomers at a range of concentrations according to non-limiting embodiments of the disclosure.
Figure 11:
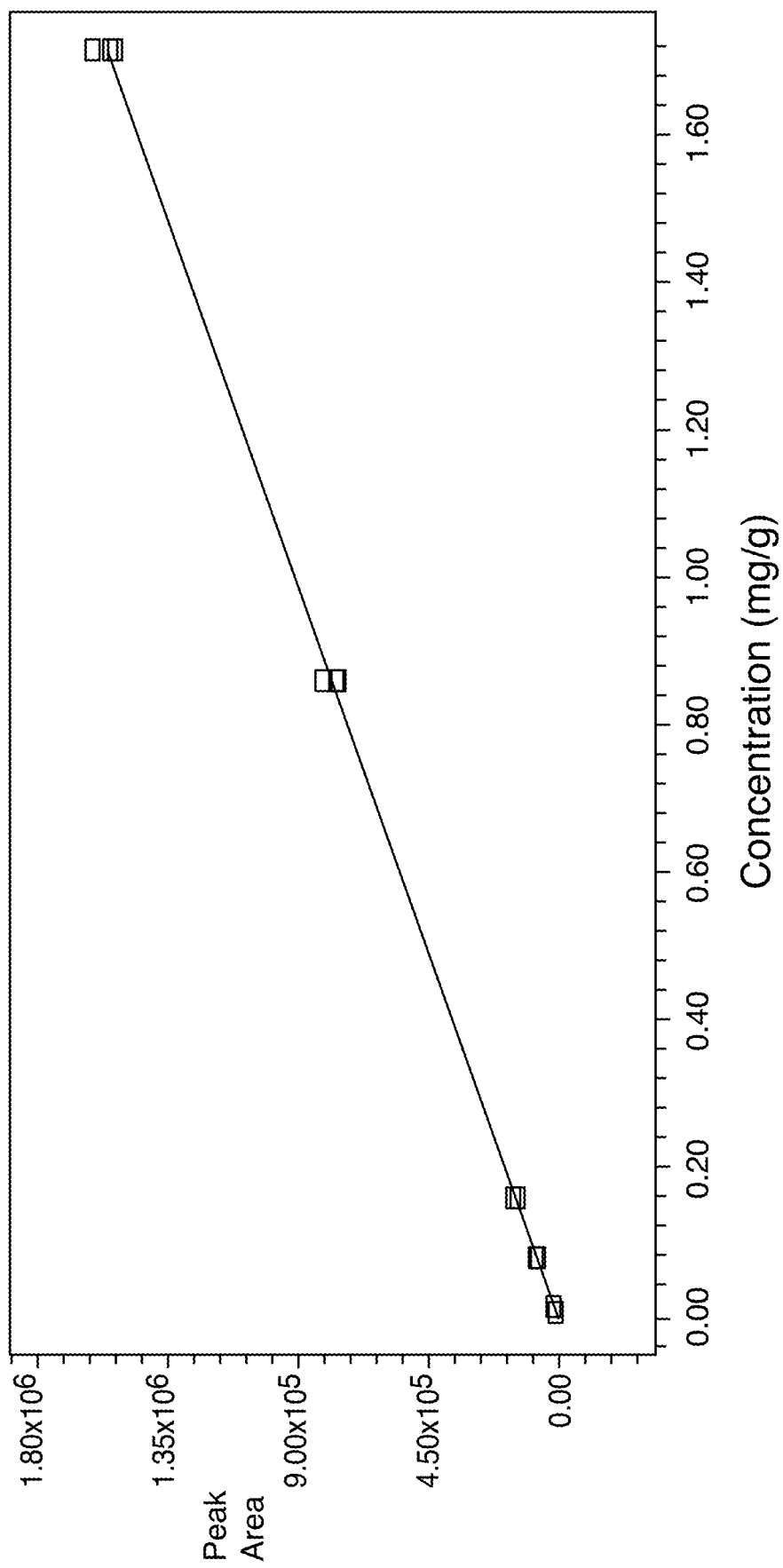
FIG. 11 depicts a calibration curve for separations depicted in FIG. 10.

An overlay of chromatograms of the all-rac-α-tocopherol standard solutions (RRR-α-tocopherol concentration range: 0.00768 mg/g to 1.72 mg/g) is provided in FIG. 10, which shows consistent separations across the range of concentrations.
The linearity of the method is demonstrated by the calibration curve provided in FIG. 11. The limit of quantitation (LOQ) was estimated at 0.002 mg/g of sample (S/N=10) based on a S/N of 24 at the lowest calibration standard solution concentration (0.00768 mg/g) and the sample concentration of 1.5 mg/g in the final solution. The curve parameters were: Calibration equation: $Y=9.09\times 10^5 X - 2.60\times 10^3$; $R^2$: 0.999.

Example 10. Analysis of Samples for RRR-α-Tocopherol

Samples of various dietary supplement products containing vitamin E were analyzed for tocopherol content according to an embodiment of the disclosed method using the following conditions:
System: $UPC^2$
Column: Trefoil AMY1 (2.5 mm 3×150 mm)×2 (i.e., 2 columns in series)
Mobile phase: 93% $CO_2$ and 7% co-solvent
Co-solvent: 98/2 v/v methanol/water
Elution: Isocratic at a flow rate of 0.5 ml/min
ABPR: 1500 psi
Column temp.: 30° C.
Injection Volume: 2 ml
Detection: UV at 290 nm with 6 nm UV resolution (compensate reference 390-450 nm)

The results are provided in FIGS. 12A-12D and Table 2. The mean results are average values of three replicated measurements for each sample, and a RSD of 0.7% was obtained in the analysis of three samples. As shown in Table 2, excellent agreement between the quantitative results and the label claims were obtained for samples M (FIG. 12C) and G (FIG. 12D). For sample P (FIG. 12B), the measured RRR-α-tocopherol was 14% higher than its label claim. A chromatogram showing separation of the all-rac-α-tocopherol standard is provided as FIG. 12A.

TABLE 2

Determination of R,R,R-α-tocopherol in dietary Supplements and comparison to their label claims.

| Sample | RRR-α-tocopherol (mg/serving) | | Label Claim (as RRR-α-tocopherol) (mg/serving) | Difference (%) |
| --- | --- | --- | --- | --- |
| | Mean | RSD | | |
| P | 305 | 0.7% | 267 | 14.2 |
| M | 267 | 0.7% | 267 | −0.1 |
| G | 266 | 0.7% | 267 | −0.3 |

Example 11. Qualitative Analysis of Natural Vitamin E in Infant Formula

Qualitative analysis of natural vitamin E was conducted on an infant formula powder sample after it was saponified, extracted, and reconstituted. The chromatography was performed as in Example 10. The single RRR-α-tocopherol peak near RT 25 min (FIG. 13) indicates that the vitamin E in this infant formula was mainly natural vitamin E and not synthetic vitamin E.

The invention claimed is:

1. A method for the chiral separation of stereoisomers of α-tocopherol or α-tocopheryl acetate in a sample, the method comprising:
   a. providing a sample comprising at least one stereoisomer of α-tocopherol or α-tocopheryl acetate;
   b. contacting said sample with a column chromatography device comprising a first column having an interior portion at least partially filled with an immobilized stationary phase, wherein the immobilized stationary phase comprises amylose tris(3,5-dimethylphenylcarbamate), cellulose tris(3,5-dimethylphenylcarbamate), or cellulose tris(3-chloro-4-methylphenylcarbamate);
   c. flowing a mobile phase through the immobilized stationary phase for a period of time, the mobile phase comprising carbon dioxide and a co-solvent which is a combination of acetonitrile and water; and
   d. eluting the at least one stereoisomer of α-tocopherol or α-tocopheryl acetate from the immobilized stationary phase in the mobile phase; and
   e. detecting the presence of the at least one stereoisomer of α-tocopherol or α-tocopheryl acetate using a detector.

2. The method of claim 1, wherein the sample comprises all-rac-α-tocopherol or all-rac-α-tocopheryl acetate.

3. The method of claim 1, wherein the sample comprises RRR-α-tocopherol and other stereoisomers of α-tocopherol, the method comprising separating the RRR-α-tocopherol from the other stereoisomers of α-tocopherol.

4. The method of claim 1, wherein the sample is a dietary supplement, a food, a food ingredient, or a medicine.

5. The method of claim 1, wherein no sample derivatization is performed.

6. The method of claim 1, wherein the immobilized stationary phase comprises amylose tris(3,5-dimethylphenylcarbamate) or cellulose tris(3,5-dimethylphenylcarbamate).

7. The method of claim 1, wherein the eluting is performed under isocratic conditions.

8. The method of claim 1, wherein the eluting is performed under gradient conditions.

9. The method of claim 1, wherein the co-solvent is present in the mobile phase in an amount up to about 15% by volume.

10. The method of claim 1, wherein the mobile phase is 97% $CO_2$ and 3% by volume of a mixture of acetonitrile and water in a ratio by volume of 98:2.

11. The method of claim 1, wherein flowing the mobile phase through the immobilized stationary phase is performed at a flow rate from about 0.5 mL/min to about 2 mL/min.

12. The method of claim 1, wherein a column temperature is from about 10 to about 50° C.

13. The method of claim 1, further comprising identifying the source of α-tocopherol as natural or synthetic.

14. The method of claim 1, wherein the sample comprises RRR-α-tocopherol, the method further comprising quantitatively determining a concentration of the RRR-α-tocopherol in the sample.

15. The method of claim 1, further comprising converting any α-tocopheryl esters which may be present in said sample to α-tocopherol, wherein the converting comprises subjecting the sample to saponification conditions.

* * * * *